(12) United States Patent
Itou et al.

(10) Patent No.: US 8,728,666 B2
(45) Date of Patent: May 20, 2014

(54) POSITIVE ELECTRODE MATERIAL FOR LITHIUM ION BATTERY WITH NONAQUEOUS ELECTROLYTE, AND BATTERY USING THE SAME

(75) Inventors: Takanori Itou, Hiratsuka (JP); Hideaki Horie, Yokosuka (JP); Takamitsu Saito, Yokohama (JP); Satoshi Matsumoto, Niihama (JP)

(73) Assignees: Nissan Motor Co., Ltd., Kanagawa (JP); Sumitomo Metal Mining Co., Ltd., Tokyo (JP)

( * ) Notice: Subject to any disclaimer, the term of this patent is extended or adjusted under 35 U.S.C. 154(b) by 974 days.

(21) Appl. No.: 11/912,819

(22) PCT Filed: Apr. 28, 2006

(86) PCT No.: PCT/JP2006/309054
§ 371 (c)(1),
(2), (4) Date: Oct. 26, 2007

(87) PCT Pub. No.: WO2006/118279
PCT Pub. Date: Nov. 9, 2006

(65) Prior Publication Data
US 2009/0029253 A1    Jan. 29, 2009

(30) Foreign Application Priority Data

Apr. 28, 2005    (JP) .................. 2005-133667

(51) Int. Cl.
*H01M 4/52* (2010.01)
*H01M 4/525* (2010.01)

(52) U.S. Cl.
USPC ..................................... 429/223

(58) Field of Classification Search
USPC ........................................... 429/223
See application file for complete search history.

(56) References Cited

U.S. PATENT DOCUMENTS

| | | | |
|---|---|---|---|
| 6,400,122 B1 | 6/2002 | Iwamura | |
| 2003/0091896 A1 | 5/2003 | Watanabe et al. | |
| 2004/0253516 A1 | 12/2004 | Yuasa et al. | |
| 2007/0212602 A1 | 9/2007 | Yuasa et al. | |

FOREIGN PATENT DOCUMENTS

| | | |
|---|---|---|
| EP | 1487038 A2 | 12/2004 |
| JP | 1-176658 A | 7/1989 |
| JP | 9-129230 A | 5/1997 |
| JP | 9-259938 A | 10/1997 |
| JP | 2001-085006 A | 3/2001 |
| JP | 2001-110379 A | 4/2001 |
| JP | 2001-202948 A | 7/2001 |
| JP | 2001-243951 A | 9/2001 |
| JP | 2003-151526 A | 5/2003 |
| JP | 2005-5105 A | 1/2005 |
| JP | 2005-251716 A | 9/2005 |

*Primary Examiner* — Tracy Dove
(74) *Attorney, Agent, or Firm* — Foley & Lardner LLP

(57) ABSTRACT

An object of the present invention is to provide a positive electrode material for non-aqueous electrolyte lithium-ion battery which capable of discharging high output power and inhibiting cracking of secondary particle in the cyclic endurance at a high temperature. The above object can be attained by a positive electrode material for non-aqueous electrolyte lithium-ion battery of the present invention, characterized in that said material comprises secondary particles composed of primary particles of lithium nickel composite oxide containing the primary particles having different aspect ratios, and that at least a part of said primary particles having different aspect ratios are arranged so as to make the longitudinal direction (the long side direction) thereof oriented toward the center of the secondary particle.

17 Claims, 9 Drawing Sheets

FIG.3
A
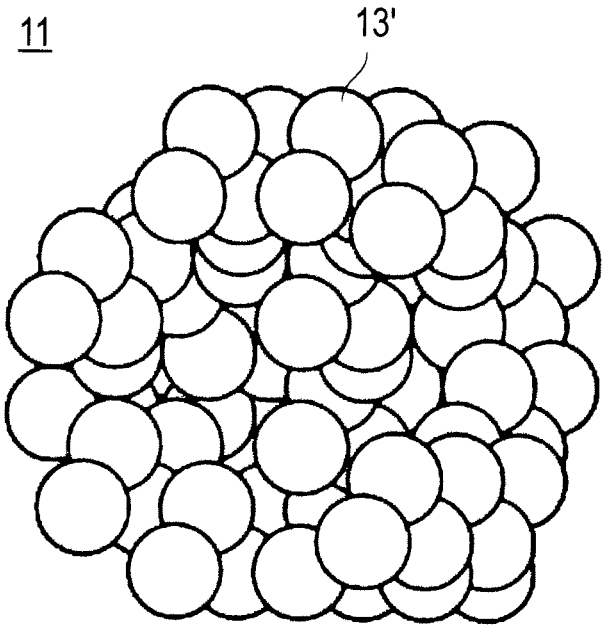
B
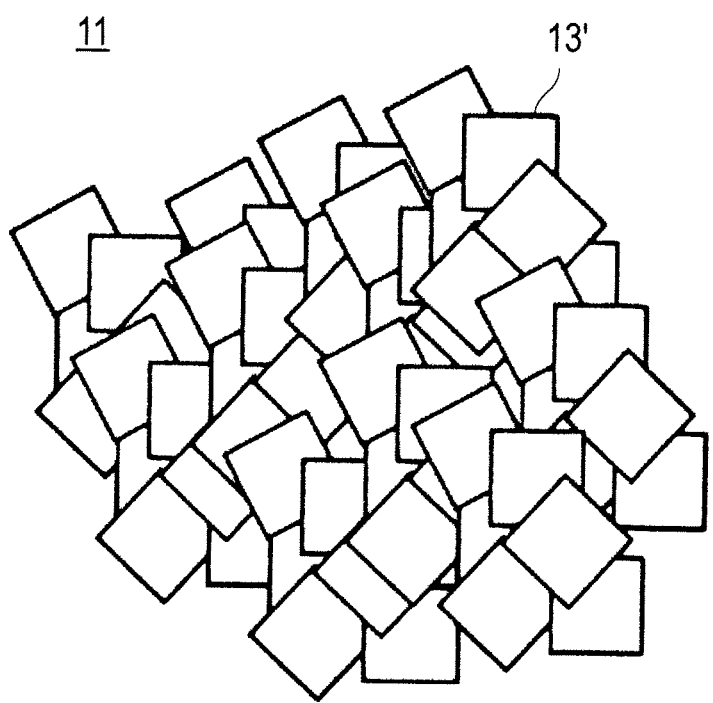

FIG.6
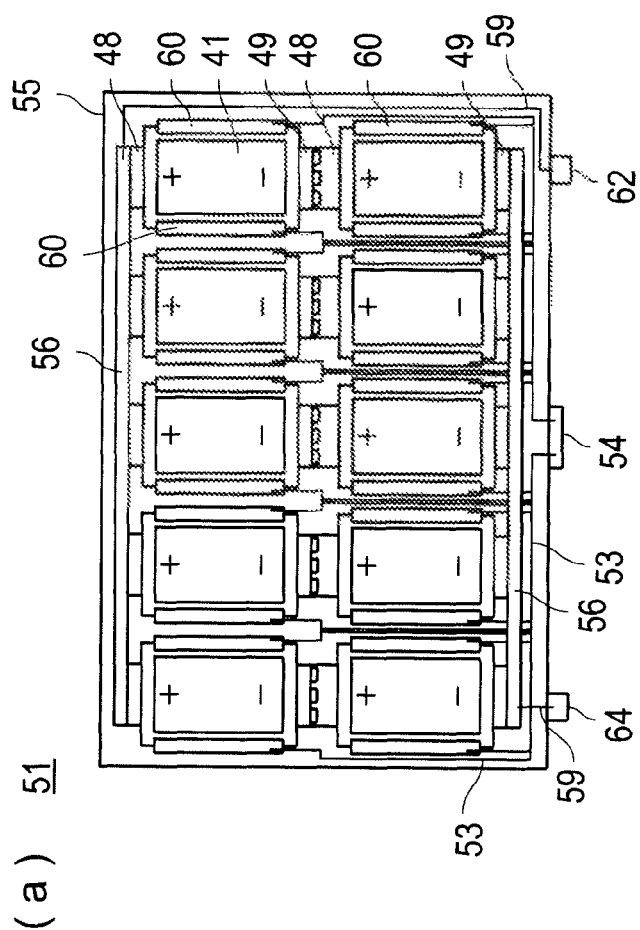
(a)
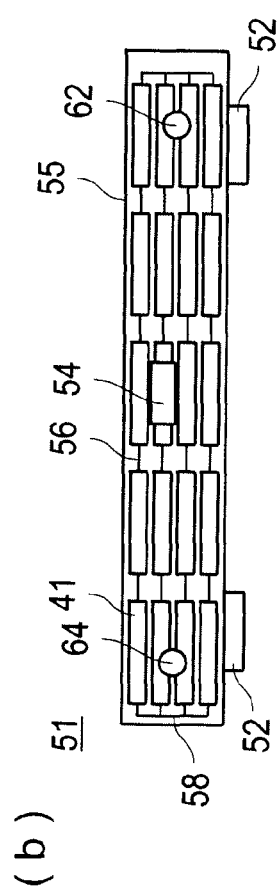
(b)
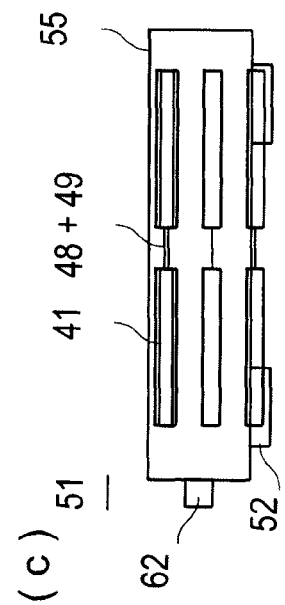
(c)

POSITIVE ELECTRODE MATERIAL FOR LITHIUM ION BATTERY WITH NONAQUEOUS ELECTROLYTE, AND BATTERY USING THE SAME

TECHNICAL FIELD

The present invention relates to a positive electrode material for non-aqueous electrolyte lithium-ion battery comprising lithium nickel composite oxide as a positive electrode active material and a non-aqueous electrolyte lithium-ion battery comprising the same.

BACKGROUND ART

Currently, as a non-aqueous electrolyte secondary battery for mobile devices such as cell-phone, lithium-ion secondary battery has been commercialized. In this non-aqueous electrolyte lithium-ion secondary battery, reduction in thickness of the battery itself has been required as reductions in weight and thickness of mobile devices progress. Recently, development of a thin type battery using a laminated film as an exterior material has progressed, and a laminate type of thin type battery using a lithium cobalt oxide ($LiCoO_2$) as a positive electrode active material, a graphitic material or a carbonaceous material as a negative electrode active material, an organic solvent dissolving a lithium salt or a polymer electrolyte as a non-aqueous electrolyte is being put into practical use.

Furthermore, in recent years, along with shifts toward multifunction and high-performance of mobile devices, power consumptions of devices are increasing, and for battery as a power source for them, requirements of higher output power, high temperature stability in electrolytic solution, cost, and environmental issues are becoming more and more intensified. Consequently, development of lithium nickel composite oxides (for example, $LiNiCoAlO_2$, $Li(Ni,Co,Mn)O_2$), which can be expected to contribute to higher output power and improved high temperature stability in electrolytic solution in comparison with the existing lithium cobalt oxide, is progressing.

Aside from these applications, in recent years, in order to promote introduction of electric vehicle (EV), hybrid electric vehicle (HEV) and fuel cell vehicle (FCV) against a background of heightened environmental protection movement, developments of a power source for driving these motors or an auxiliary power source for hybrid electric vehicle, etc. are promoted. In these applications, a repeatedly chargeable and dischargeable non-aqueous electrolyte lithium-ion secondary battery is used. In an application such as driving a motor for EV, HEV and FCV where high output power and high energy density are required, since a single large type battery cannot practically be manufactured, an assembled battery, which is configured by plural batteries connected in series, is generally used. As a unit battery constituting such an assembled battery, use of a laminate type of thin type non-aqueous electrolyte lithium-ion battery (referred to simply as a thin type laminated battery) has been proposed (see, for example, JP-A-2003-151526).

Further, JP-A-2001-243951 discloses a positive electrode active material consisting of secondary particles, which are agglutinates of a number of primary particles, mentioning radial arrangement of said primary particles.

For more detail, a positive electrode active material for non-aqueous electrolyte secondary battery using lithium cobaltate, which consists of secondary particles that are agglutinates of a number of minute primary particles of lithium cabaltate represented by a general formula of $LiCoO_2$, wherein said agglutinates of secondary particles have a number of minute vacancies into which electrolytic solution can penetrate and a tap density of 2.2 kg/cm³ or more, characterized in that at least a part of said minute primary particles are radially arranged along a direction from the center of secondary particle toward outside and that there are vacancies among a radially arranged minute primary particle and neighboring other similarly radially arranged minute primary particles, has been reported.

DISCLOSURE OF INVENTION

However, in the battery comprising a positive electrode material containing these secondary particles composed of lithium nickel composite oxide particles (primary particles) as a positive electrode active material, there were such problems that repeated high output power discharges at a high temperature, for example, for HEV, etc., as described in the above JP-A-2003-151526, caused cracking in said secondary particles leading to decreases in capacity and output power. In addition, even though a particle of positive electrode material was designed as described in the above JP-A-2001-243951, since a direction of the primary particle itself had not been determined, there was still a room for further improvement in cyclic endurance.

In order to solve the abovementioned problem, inhibition of the cracking of secondary particles has been studied by modifying the particle design of positive electrode material, however, a positive electrode active material having sufficiently acceptable output power for HEV or FCV etc. and cyclic endurance at high temperature has not been obtained.

Thus, an object of the present invention is to provide a positive electrode material for non-aqueous electrolyte lithium-ion battery, which is capable of discharging high output power and preventing cracking of the secondary particles in cyclic endurance at a high temperature.

More specifically, the object of the present invention can be attained by a positive electrode material for non-aqueous electrolyte lithium-ion battery, characterized in that said material comprises a secondary particle comprising primary particles of lithium-nickel composite oxide having different aspect ratios (a aspect ratio is different from 1), as a positive electrode active material, and that at least a part of said primary particles having different aspect ratios are arranged so as to make the longitudinal direction (the long side direction) thereof oriented toward the center of the secondary particle.

Further other objects, features and characteristics of the present invention will become clear by referring to the preferable embodiments illustrated in the following descriptions and accompanying drawings.

BRIEF DESCRIPTION OF THE DRAWINGS

FIG. 1A is a schematic diagram illustratively representing a spherical secondary particle, in which about 100% (almost total quantity) of the primary particles are arranged so as to make the longitudinal direction (the long side direction) thereof oriented toward the center of secondary particle. FIG. 1B is a schematic diagram illustratively representing a spherical secondary particle, in which about 80% of the primary particles are arranged so as to make the longitudinal direction (the long side direction) thereof oriented toward the center of secondary particle. FIG. 1C is a schematic diagram illustratively representing a spherical secondary particle, in which about 20% of the primary particles are arranged so as to make the longitudinal direction (the long side direction) thereof oriented toward the center of secondary particle.

FIG. 3 are drawings illustratively representing a lithium nickel composite oxide particle as a positive electrode active material wherein said active substance composes a spherical secondary particle composed of primary particles having equivalent aspect ratios. FIG. 3A is a schematic diagram illustratively representing a nearly spherical secondary particle composed of spherical primary particles having equivalent aspect ratios. FIG. 3B is a schematic diagram illustratively representing a nearly spherical secondary particle composed of cubic primary particles having equivalent aspect ratios.

FIG. 6 is the pattern diagrams showing an example of assembled battery connecting the bipolar batteries of the present invention in 2 series and 20 parallels. FIG. 6(a) is a top view of the assembled battery, FIG. 6(b) is a front view of the assembled battery, and FIG. 6(c) is a right side view of the assembled battery. In each of these FIGS. 6(a) to (c), inside of the battery assembly is shown by seeing through an exterior case, so that a manner in which bipolar batteries are connected both in series and in parallel can be understood.

FIG. 7(a) is a top view of the assembled battery, FIG. 7(b) is a front view of the assembled battery, and FIG. 7(c) is a right side view of the assembled battery. In each of these FIGS. 7(a) to (c), inside of the assembled battery is shown by seeing through an exterior case, so that a manner in which a bipolar battery A of the present invention and non-bipolar type of lithium-ion secondary batteries B of the present invention are connected both in series and in parallel can be understood.

FIG. 8(a) is a top view of the composite assembled battery FIG. 8(b) is a front view of the composite assembled battery and FIG. 8(c) is a right side view of the composite assembled battery.

BEST MODE FOR CARRYING OUT THE INVENTION

Figure 1:
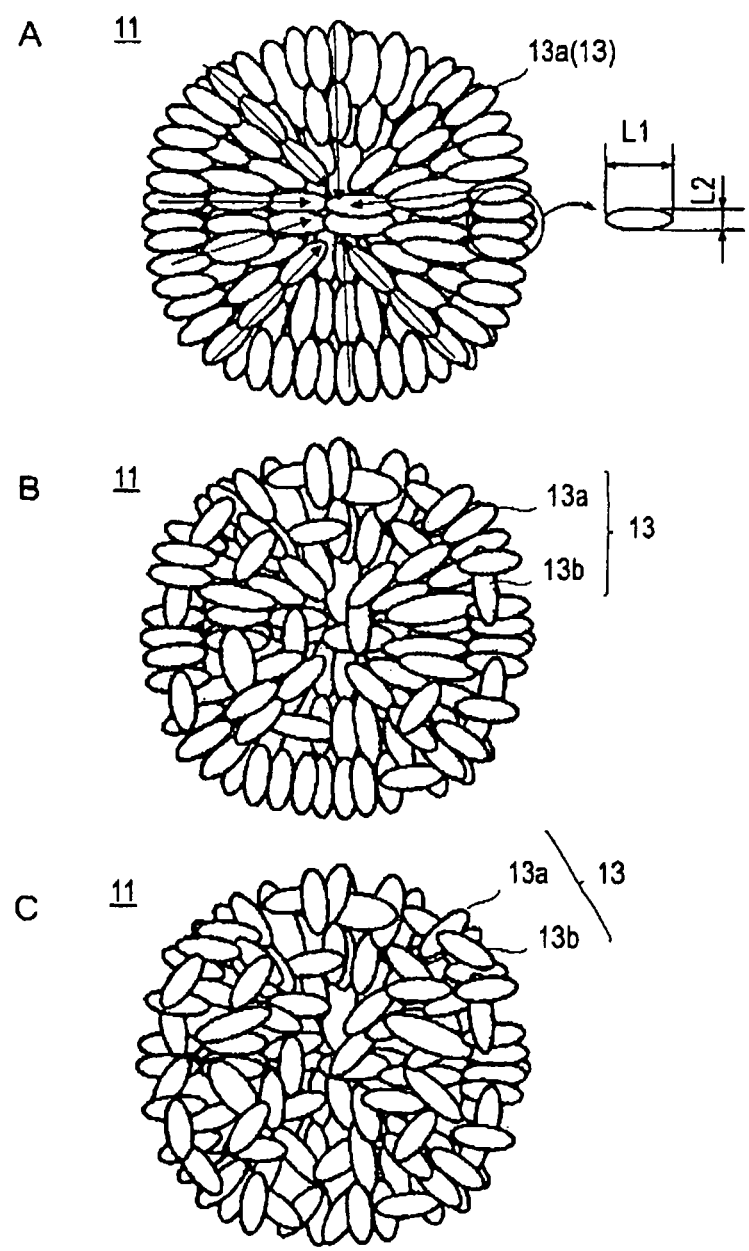
FIG. 1 are drawings illustratively representing a lithium nickel composite oxide particle as a positive electrode active material wherein said active material composes spherical secondary particles composed of oval-sphere-shaped primary particles having different aspect ratios, and at least a part of said primary particles having different aspect ratios are arranged so as to make the longitudinal direction (the long side direction) thereof oriented toward the center of secondary particle.

Hereinafter, best modes for carrying out the present invention will be described in detail.

A positive electrode material for non-aqueous electrolyte lithium-ion battery of the present invention, characterized in that said material comprises a secondary particle comprising primary particles of lithium-nickel composite oxide having different aspect ratios (a aspect ratio is different from 1), as a positive electrode active material, and that at least a part of said primary particles having different aspect ratios are arranged so as to make the longitudinal direction (the long side direction) thereof oriented toward the center of the secondary particle.

In the present invention, since the secondary particle of lithium nickel composite oxide is comprising the primary particles having different aspect ratios such as rectangular, oval-sphere, needle-like, plate-like, horn, columnar, etc. shaped, and at least a part of said primary particles having different aspect ratios are arranged so as to make the longitudinal direction (the long side direction) thereof oriented toward the center of secondary particle, a positive electrode material for lithium-ion battery, which can prevent cracking of secondary particles even after high output power charge and discharge at a high temperature, can be provided. Thus, the positive electrode material for lithium-ion battery of the present invention can greatly contribute to commercial application of a non-aqueous electrolyte lithium-ion second battery, which enables high output power discharge in applications such as a power source for driving motors for EV, HEV, FCV, etc., an auxiliary power source for hybrid electric vehicle etc., and is superior in cyclic endurance at a high temperature, and also repeatedly chargeable and dischargeable.

Hereinafter, the present invention will be explained referring to the drawings.

Figure 2:
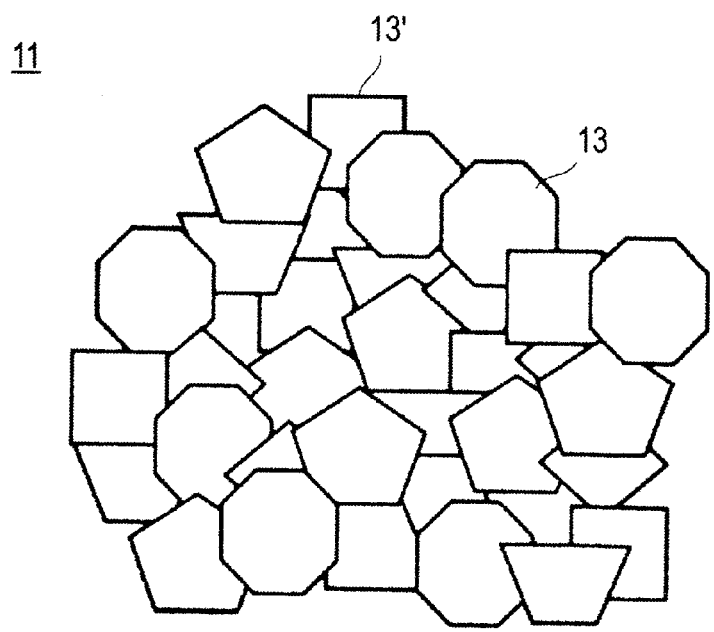
FIG. 2 is a schematic diagram illustratively representing a lithium nickel composite oxide particle as a positive electrode active material, wherein said active material composes a nearly spherical secondary particle with a porosity of about 0% composed of amorphous primary particles having different aspect ratios, and at least a part of said primary particles having different aspect ratios are arranged so as to make the longitudinal direction (the long side direction) thereof oriented toward the center of secondary particle.

FIG. 1 are drawings illustratively representing a lithium nickel composite oxide particle as a positive electrode active material, wherein said active material comprises spherical secondary particles comprising oval-sphere-shaped primary particles having different aspect ratios, and at least a part of said primary particles having different aspect ratios are arranged so as to make the longitudinal direction (the long side direction) thereof oriented toward the center of secondary particle. FIG. 1A is a schematic diagram illustratively representing a spherical secondary particle comprising oval-sphere-shaped primary particles, in which about 100% (almost total quantity) of the primary particles are arranged so as to make the longitudinal direction (the long side direction) thereof oriented toward the center of secondary particle. FIG. 1B is a schematic diagram illustratively representing a spherical secondary particle comprising oval-sphere-shaped primary particles, in which about 80% of the primary particles are arranged so as to make the longitudinal direction (the long side direction) thereof oriented toward the center of secondary particle. FIG. 1C is a schematic diagram illustratively representing a spherical secondary particle comprising oval-sphere-shaped primary particles, in which about 20% of the primary particles are arranged so as to make the longitudinal direction (the long side direction) thereof oriented toward the center of secondary particle. FIG. 2 is a schematic diagram illustratively representing a nearly spherical secondary particle comprising amorphous primary particles having different aspect ratios of a lithium nickel composite oxide particle as a positive electrode active material, wherein at least a part of said primary particles having different aspect ratios are arranged so as to make the longitudinal direction (the long side direction) thereof oriented toward the center of secondary particle. FIG. 3 are drawings illustratively representing a spherical secondary particle comprising primary particles having equivalent aspect ratios of a lithium nickel composite oxide particle as a positive electrode active material. FIG. 3A is a schematic diagram illustratively representing a nearly spherical secondary particle comprising spherical primary particles having equivalent aspect ratios. FIG. 3B is a schematic diagram illustratively representing a nearly spherical secondary particle comprising cubic primary particles having equivalent aspect ratios.

In this connection, composition (material) of the lithium nickel composite oxide, which can be used for the positive electrode material for non-aqueous electrolyte lithium-ion battery of the present invention, is not particularly limited, but preferably a lithium nickel cobalt manganese composite oxide represented by the following chemical formula (1).

[Formula 1]

$$Li_aNi_bCo_cMn_dM_eO_fN_g \quad (1)$$

In the above formula, the following relationships are satisfied: $0<a≤1.2$, $0.3≤b≤0.9$, $0≤c≤0.6$, $0.25≤d≤0.6$, $0≤e≤0.3$, $1.5≤f≤2.2$, and $0≤g≤0.5$. M represents Al or at least one kind of Mg, Ca, Ti, V, Cr, Fe and Ga; and N represents at least one kind of F, Cl and S. Composition of these lithium nickel composite oxide can be analyzed by using high-frequency inductively coupled plasma (ICP), atomic absorption spectrometry, fluorescent X-ray spectrometry, chelatometric titration, or particle analyzer.

The lithium nickel composite oxide particle of the positive electrode active material of the present invention comprises a secondary particle 11 aggregated by a plurality of primary particles 13 having different aspect ratios as shown in FIG. 1, and at least a part of said primary particles 13 having different aspect ratios are arranged so as to make the longitudinal direction (the long side direction) thereof oriented toward the center of secondary particle 11. Since the conventional lithium nickel composite oxide particle formed granular secondary particles aggregated by spherical primary particles having equivalent aspect ratios, at charge or discharge, especially by repeating high output power charge or discharge at a high temperature, spaces among the primary particles expanded due to expansion/contraction of the primary particles, causing cracking of the secondary particle. The lithium nickel composite oxide particle of the positive electrode active material of the present invention comprises secondary particle comprising primary particles having different aspect ratios, wherein at least apart of said primary particles 13 having different aspect ratios are arranged so as to make the longitudinal direction (the long side direction) thereof oriented toward the center of secondary particle 11, in this manner, when a volume of the secondary particle expands or contracts, the primary particles having different aspect ratios and being arranged so as to make the longitudinal direction (the long side direction) thereof oriented toward the center of secondary particle 11, can expand or contract smoothly or lubriciously along the longitudinal axis direction thereof. However, the primary particles may be allowed to exist as it is, within a range in which the effect of the present invention is not impaired.

Shape of the primary particle having different aspect ratios is not particularly limited, so long as it is not in the spherical or cubic shape, but preferably in the rectangular, oval-sphere, needle-like, plate-like, horn or columnar shape. In addition, the primary particle having different aspect ratios also includes one which is not in spherical or cubic, but amorphous shape (refer to FIG. 2).

The above primary particle having different aspect ratios means the primary particle in which at least aspect ratios are not equivalent, that is, aspect ratio is not 1. More specifically, when the primary particle having different aspect ratios is in the rectangular, needle-like, plate-like or horn shape, a ratio of long diameter to short diameter, is 1.5 or more, preferably in a range from 1.5 to 10, and more desirably in a range from 2 to 8. Similarly, when the primary particle having different aspect ratios is in the oval-sphere or columnar shape, a ratio of long diameter to short diameter, is 1.5 or more, preferably in a range from 1.5 to 10, and more desirably in a range from 2 to 8. When the aspect ratio is less than 1.5, it becomes difficult that the primary particle having different aspect ratios in which the longitudinal direction (the long side direction) thereof is oriented toward the center of secondary particle 11 would expand or contract along the longitudinal axis direction thereof. Hence, it becomes difficult to sufficiently prevent moving away of the primary particles composing the secondary particle from each other, and prevent cracking of the secondary particle stably for a long period. Thus, it could become difficult that the effect of the present invention is sufficiently exerted. On the contrary, when the aspect ratio is over 10, the bond between the primary particles becomes weak, and cyclic endurance is sometimes remarkably decreased.

The primary particle of lithium nickel composite oxide means one containing the primary particle in which the aspect ratios are not equivalent, that is, aspect ratio is not 1. However, the primary particles in which aspect ratios are equivalent, that is, the aspect ratio is 1 (more specifically, 1.3 or less, as discussed in Examples and Comparative Examples) being in the spherical or cubic shape may be contained, if it is within a range in which the effect of the present invention, is not impaired (refer to FIG. 3). More specifically, said primary particle of lithium nickel composite oxide desirably is contained in an amount of not less than 20%, preferably 30%, and more preferably 40% of the primary particle having different aspect ratios. Due to this, moving away of the primary particles composing the secondary particle from each other is prevented, and cracking of the secondary particle can be suppressed. When the content of the primary particle having different aspect ratios is contained in an amount of not less than 20%, due to high content of the primary particle having equivalent aspect ratios, it becomes difficult that the primary particle having different aspect ratios in which the longitudinal direction (the long side direction) thereof is oriented toward the center of the secondary particle 11 expands or contracts along the longitudinal axis thereof. Hence, it becomes difficult to sufficiently prevent moving away of the primary particles composing the secondary particle from each other, and suppress cracking of the secondary particle stably for a long period. Thus, it could become difficult that the effect of the present invention is sufficiently exerted. On the contrary, upper limit of the ratio (probability) of the primary particle having different aspect ratios is not limited at all. Namely, since higher content of the primary particle having different aspect ratios can suppress increasing rate of internal resistance more effectively, the whole amount (nearly 100%) thereof may be composed of the primary particle having different aspect ratios. Such secondary particle in which the whole amount (nearly 100%) thereof is composed of the primary particle having different aspect ratios can be manufactured by controlling thermal decomposition temperature and calcination temperature in the synthesis process as shown in Examples described later (for details, refer to each Example).

Further, in the present invention, the positive electrode active material is characterized in that at least a part of the primary particles 13 having different aspect ratios composing the secondary particle 11 are arranged so as to make the longitudinal direction (the long side direction) thereof oriented toward the center of the secondary particle M, as shown in FIGS. 1, A to C. More specifically, as the positive electrode active material, 50% (refer to FIG. 1C) or more, preferably 60% or more, further preferably 80% (refer to FIG. 1B) or more, and particularly preferably about 100% (refer to FIG. 1A) of the primary particles 13 having different aspect ratios is desirably composed of the primary particles 13a in which the longitudinal direction (the long side direction) thereof is oriented toward the center of the secondary particle M. As the positive electrode active material, when only less than 50% of the primary particles 13 having different aspect ratios comprises the primary particles 13a in which the longitudinal direction (the long side direction) thereof is oriented toward the center of the secondary particle M (for example, refer to FIG. 1C), even between neighboring primary particles composing the secondary particle 11 in which the longitudinal directions (the long side directions) thereof are oriented different directions each other, each primary particle hinders other particles to expand or contract along the longitudinal direction (the long side direction) thereof. As a result, the space among primary particles could be expanded and cracking of the secondary particle could easily occur, due to expansion at charge and discharge. However, since easiness of expansion and contraction (following capability) at charge and discharge varies depending on value of aspect ratio of the primary particle, content of the primary particle having different aspect ratios, porosity of the secondary particles, and the like, content of the primary particles 13 having different aspect ratios is not necessarily limited to the above ranges. It should be noted that, 13b in the drawings represents the primary particle in which the longitudinal direction (the long side direction) thereof is oriented toward different from the center of the secondary particle M. It should be noted that, in FIG. 1, the primary particle was explained as an oval-sphere-shaped one, and similarly in the case of primary particle having different aspect ratios which has other shape, for example, rectangular, needle-like, plate-like, horn-shaped, columnar or amorphous shape, the longitudinal direction means the long side direction. Ratio of the primary particle 13a in which the longitudinal direction (the long side direction) thereof is oriented toward the center of secondary particle can be determined by processing an electrode (or a secondary particle of the positive electrode active material) using Focused Ion Beam (FIB) to cut out a cross-section of the electrode (or the secondary particle of the positive electrode active material), and observing through a SEM.

In addition, in the present invention, porosity of the secondary particle is in a range from 0.2 to 5%, preferably from 0.3 to 3%, and more preferably from 0.5 to 3%. When porosity is less than 0.2%, an expansion space (vacancy section), which is necessary when the primary particle 13 expands due to an electrode reaction at charge and discharge, cannot be sufficiently secured. Hence, it becomes difficult that the primary particle 13 having different aspect ratios composing the secondary particle 11 in which the longitudinal direction (the long side direction) thereof is oriented toward the center of secondary particle 11 easily expands or contracts along the longitudinal axis direction thereof. As a result, space among primary particles could be expanded and cracking of the secondary particle could easily occur, due to expansion at charge and discharge. On the contrary, in the case of porosity over 5%, contacting area between the neighboring primary particles decreases when the primary particle expands (contracts) due to an electrode reaction at charge and discharge, and internal resistance could be increased. However, since easiness (following capability) of expansion/contraction at charge and discharge varies depending on value of aspect ratio of the primary particles, composition ratio of the primary particles having said different aspect ratios, and ratio of primary particle 13a which is oriented toward the center of secondary particle, the porosity is not necessarily limited to the above range.

Measurement of the porosity of the secondary particle described above is performed, for example, by cutting out a cross-section of the secondary particle made of a positive electrode active material by means of FIB processing as shown in FIG. 1A, and obtaining image data of the cross-section by SEM. The image data obtained are loaded into a computer, and the cross-section is divided into a vacancy part and a material part by image processing.

Porosity=Area of vacancy part/(Area of vacancy part+ Area of positive electrode material part)×100    [Equation 1]

Porosity is calculated by the above equation. Measured value of porosity is obtained by calculating a mean value from 10 pieces of the secondary particles.

Further, the average particle size of the positive electrode active material is not particularly limited, but desirably in a range from 0.01 to 20 µm from the view points of reactivity and cyclic endurance. However, in the present invention, the average particle size is not necessarily limited to the above range. In this connection, the average particle size of a positive electrode active material means an average particle size of positive electrode active material particles contained in a positive electrode material. Therefore, as for the positive electrode active material particle, which is contained in a positive electrode material in a state of a primary particle, particle size corresponds to the particle size of said primary particle, and as for the positive electrode active material particle, which exists as a secondary particle comprising a plurality of primary particles, particle size corresponds to the particle size of said secondary particle. The average particle size can be obtained by calculating a mean value of such particle sizes.

Average particle size of the primary particles composing the secondary particle is desirably in a range from 0.01 to 5 µm, and more desirably in a range from 0.05 to 2 µm. Average particle size of the secondary particle is desirably in a range from 0.05 to 20 µm, and more desirably in a range from 0.1 to 5 µm. In the present invention, however, the average particle sizes are not necessarily limited to the above ranges.

Figure 10:
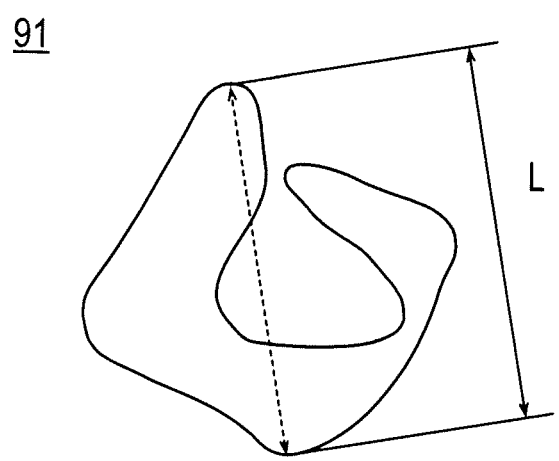
FIG. 10 is an expository diagram describing absolute maximum length, which is used in measuring diameter of a particle.

Particle size of such positive electrode active material (including both primary particle and secondary particle) can be measured by means of SEM observation or TEM observation. The positive electrode active material particles include primary particles having different aspect ratios and secondary particles comprising said primary particles (in general, spherical). Therefore, the particle size mentioned above or the like is represented by absolute maximum length because shape of particle is not uniform, and when sieving is applied, opening of sieve (mesh-through size or mesh-pass size) may be used. In this connection, the absolute maximum length means the maximum length L among the lengths between arbitrary two points on the profile line of a primary particle or a secondary particle 91, as shown in FIG. 10.

In the present invention, the secondary particle of positive electrode active material is in general formed spherically, though the possible shape differs depending on the type and the production method thereof. However, besides the spherical form, the shape of secondary particle is sometimes in an infinite shape close to spherical (refer to FIG. 2) and the like, and not particularly limited, but any shape of secondary particle can be used without any problem. Preferably, the secondary particle has a structure, in which 50% or more of the primary particles having different aspect ratios are arranged so as to make the longitudinal direction (the long side direction) thereof oriented toward the center of secondary particle, and when the secondary particle takes such structure, shape thereof becomes in general spherical. However, the second particle is not limited to such shape, and desirably an optimum shape of the secondary particle, which is capable of improving buttery characteristics such as charge and discharge properties, is selected as appropriate.

Synthesis process for the positive electrode active material of the present invention, characterized in that said material comprises secondary particles comprising primary particles of lithium nickel composite oxide, having different aspect ratios, and that at least a part of said primary particles having different aspect ratios are arranged so as to make the longitudinal direction (the long side direction) thereof oriented toward the center of secondary particle, includes, for example, a method of heating a spherical nickel hydroxide containing Co, Mn, Al and sulfur; or a mixture of nickel hydroxide containing sulfur, a Mn compound, a Co compound, an Al compound; or a mixture of nickel hydroxide containing sulfur and a composite oxide of Mn, Co and Al, at a temperature in a prescribed range. More specifically, the synthesis can be performed by using the process described as in Examples described later and the like. Namely, lithium hydroxide•hydrate and, if necessary, a spherical nickel hydroxide containing Co, Mn, sulfur, and the like, are dissolved in a suitable solvent such as water. After that, the solution is heated from room temperature up to a prescribed temperature (for example, 300° C.), then dehydrated (solvent is removed) in air for a prescribed period of time (for example, 24 hours). Particle size of an intermediate can be controlled depending on the heating temperature condition in this step. After that, thermal decomposition is carried out in a prescribed temperature range (for example, between 300 to 500° C.) for a prescribed period of time (for example, 8 hours) (porosity of secondary particle can be controlled depending on the temperature condition of the thermal decomposition). Subsequently, a calcination is carried out in a particular temperature range (for example, 500 to 850° C.) higher than said thermal decomposition temperature under the oxygen atmosphere for a prescribed period of time (for example, 24 hours), while homogenization is promoted. In this step, particles of lithium nickel composite oxide grow up. By adjusting the above calcination temperature condition, shape, size and aspect ratio of the primary particle, degree of orientation toward a particular direction of the primary particles composing secondary particle; for example, degree of orientation of the primary particles having different aspect ratio in which the longitudinal direction (the long side direction) thereof is oriented toward a particular direction such as the direction toward the center of the secondary particle can be controlled. After the calcination, temperature is sent down to room temperature (quenched) within 5 minutes while oxygen is passed through. Other elements may also be added by coprecipitating as hydroxides thereof. Further, besides hydroxides, these elements can be added as metals, oxides, nitrates or sulfates thereof.

The positive electrode material for non-aqueous electrolyte lithium-ion battery of the present invention may be those characterized in that the material forms secondary particles comprising primary particles of lithium nickel composite oxide having different aspect ratios as the above positive electrode active material, and that at least a part of said primary particles having different aspect ratios are arranged so as to make the longitudinal direction (the long side direction) thereof oriented toward the center of secondary particle. Besides those, the positive electrode material can optionally contain other positive electrode materials, if necessary. These other materials are not particularly limited, and those conventionally known can be widely applied. Hereinafter, these other materials will be explained.

Other positive electrode materials, which can be used as a positive electrode material for non-aqueous electrolyte lithium-ion battery of the present invention, can include a conductive auxiliary agent to improve electronic conductivity, binder, an electrolyte-supporting salt (lithium salt) to improve ion conductivity, polymer gel (host polymer, electrolytic solution, and the like), and the like. When a polymer gel electrolyte is used for a battery electrolyte layer, a conventionally known binder, a conductive auxiliary agent to improve electronic conductivity and the like may be contained, and a host polymer as a raw material of polymer electrolyte, an electrolytic solution or a lithium salt needs not necessarily be contained. Also, when a solution electrolyte is used for a battery electrolyte layer, a host polymer as a raw material of polymer electrolyte, an electrolytic solution or a lithium salt needs not necessarily be contained in the positive electrode material.

The conductive auxiliary agent includes acetylene black, graphite, vapor-phase growth carbon fiber (VGCF), and the like, but is not limited thereto.

As the binder, polyvinylidene fluoride (PVDF), styrene-butadiene rubber; SBR), polyimide, and the like can be used, but is not limited thereto.

The polymer gel electrolyte is a solid polymer electrolyte having ion-conducting property, which contains an electrolytic solution to be used for a conventionally known non-aqueous electrolyte lithium-ion battery, and further includes a polymer, which does not have lithium ion-conducting property and contains the similar electrolytic solution in the framework thereof.

In this connection, the electrolytic solution to be contained in the polymer gel electrolyte (electrolyte-supporting salt and plasticizer) are not particularly limited, and conventionally known various types of electrolytic solutions can be used as appropriate. For example, those which contains at least one kind of lithium salt (electrolyte-supporting salt) selected from salts of inorganic acid anions such as $LiPF_6$, LiBF4, $LiClO_4$, $LiAsF_6$, $LiTaF_6$, $LiAlCl_4$, $Li_2B_{10}Cl_{10}$, and the like; salts of organic acid an ions such as $LiCF_3SO_3$, $Li(CF_3SO_2)_2N$, $Li(C_2F_5SO_2)_2N$, and the like; a mixture thereof and the like, and use at least one kind of or a mixture of two or more kinds of plasticizers (organic solvents) such as aprotic solvent and the like selected from cyclic carbonates such as propylene carbonate, ethylene carbonate, and the like; chain-like carbonates such as dimethyl carbonate, methyl ethyl carbonate, diethyl carbonate, and the like; ethers such as tetrahydrofuran, 2-methyltetrahydrofuran, 1,4-dioxane, 1,2-dimethoxyethane, 1,2-dibutoxybutane, and the like; lactones such as γ-butyrolactone, and the like; nitriles such as acetonitrile, and the like; esters such as methyl propionate, and the like; amides such as dimethylformamide, and the like; methyl acetate; and methyl formate, can be used, but is not limited thereto.

The solid polymer electrolyte having ion-conducting property includes, for example, known solid polymer electrolyte such as polyethylene oxide (PEO), polypropylene oxide (PPO), and copolymer thereof.

As the polymer which does not have lithium ion-conducting property to be used for the polymer gel electrolyte, for example, polyvinylidene fluoride (PVDF), polyvinyl chloride (PVC), polyacrylonitrile (PAN), poly(methyl methacrylate) (PMMA), and the like can be used, but the polymer is not limited thereto. In this connection, since PAN, PMMA, and the like belong to a class, which hardly has ion-conducting property, they are exemplified here as a polymer not having lithium ion-conducting property to be used for the polymer gel electrolyte, although they can be classified as the polymer having ion-conducting property.

As the electrolyte-supporting salt to improve ion-conducting property, for example, salts of inorganic acid anions such as $LiPF_6$, LiBF4, $LiClO_4$, $LiAsF_6$, $LiTaF_6$, $LiALCL_4$, $Li_2B_{10}Cl_{10}$ and the like; salts of organic acid anions such as $Li(CF_3SO_2)_2N$, $Li(C_2F_5SO_2)_2N$, and the like; a mixture thereof and the like can be used, but the salt is not limited thereto.

Ratio (mass ratio) of the host polymer to the electrolytic solution in the polymer gel electrolyte may be determined corresponding to the intended use or the like, but is in a range from 2:98 to 90:10. Namely, the present invention works effectively particularly to a solution electrolyte or a polymer gel electrolyte using electrolytic solution, among non-aqueous electrolytes, from the viewpoint that decomposition of electrolytic solution is inhibited particularly by release of radical oxygen from the positive electrode material. Accordingly, as for the ratio (mass ratio) of the host polymer to the electrolytic solution in the polymer gel electrolyte, quantity of the electrolytic solution needs not be limited for the purpose of countermeasure against blistering of battery due to decomposition of the electrolytic solution, and the priority can be given to battery characteristics.

In the positive electrode material of the present invention, composition of the positive electrode active material according to the present invention, wherein the material forms secondary particles comprising primary particles of lithium nickel composite oxide, having different aspect ratios, and at least a part of said primary particles having different aspect ratios are arranged so as to make the longitudinal direction (the long side direction) thereof oriented toward the center of secondary particle, positive electrode active material different from the said positive electrode active material, conductive auxiliary agent, binder, polymer electrolyte (host polymer, electrolytic solution, etc.), and lithium salt should be determined in consideration of intended use of battery (output-power-oriented, energy-oriented, etc.) and ion-conducting property.

Next, the positive electrode material for non-aqueous electrolyte lithium-ion battery according to the present invention can be widely applied to non-aqueous electrolyte lithium-ion battery.

Namely, the battery to which the positive electrode material of the present invention can be applied includes a non-aqueous electrolyte lithium-ion battery using a positive electrode material of which capacity enhancement can be expected. Such battery enables to achieve, in particular, high energy density and high output power density, and can be suitably utilized as a power source for driving a vehicle, and furthermore is sufficiently applicable to non-aqueous electrolyte secondary battery for mobile devices such as cell-phone and the like. Therefore, the non-aqueous electrolyte secondary battery using the positive electrode material of the present invention will be explained, but application of the positive electrode material of the present invention should not be limited thereto.

Namely, the non-aqueous electrolyte lithium-ion battery, which is the subject of the present invention, may be a non-aqueous electrolyte lithium-ion battery using the positive electrode material of the present invention, and other constituent requirements should not be limited. For example, when the non-aqueous electrolyte lithium-ion battery is classified by type of usage, the battery of the present invention can be applied to any type of primary battery or secondary battery. When the non-aqueous electrolyte lithium-ion battery is classified by configuration or structure, the battery of the present invention can be applied to any conventionally known configuration or structure such as laminate type (flat type) battery, coil type (cylindrical type) battery, or the like. Further, when the battery is classified by electric connection type (electrode structure), the battery of the present invention can be applied to any of non-bipolar type (internally parallel connection type) battery or bipolar type (internally series connection type) battery. The bipolar battery can provide an electric cell having higher voltage as compared with usual batteries, and constitute a battery having excellent capacity and output characteristics. The polymer battery is advantageous from the viewpoint that it is highly reliable because liquid shunt is of no matter due to no liquid spill, and enables to form a non-aqueous battery excellent in output characteristics with a simple configuration. In addition, the polymer battery is also advantageous from the viewpoints of cost and workability because long-term reliability can be secured by sealing technique such as simple thermo-compression bonding if laminate type (flat type) battery structure is employed.

Therefore, the non-bipolar type non-aqueous electrolyte lithium-ion secondary battery and the bipolar type non-aqueous electrolyte lithium-ion secondary battery which use the positive electrode material of the present invention will be briefly explained referring to the drawings in the following description, but the battery of the present invention should not be limited thereto by no means. Namely, constituent requirements different from the positive electrode material described above should never be limited.

Figure 4:
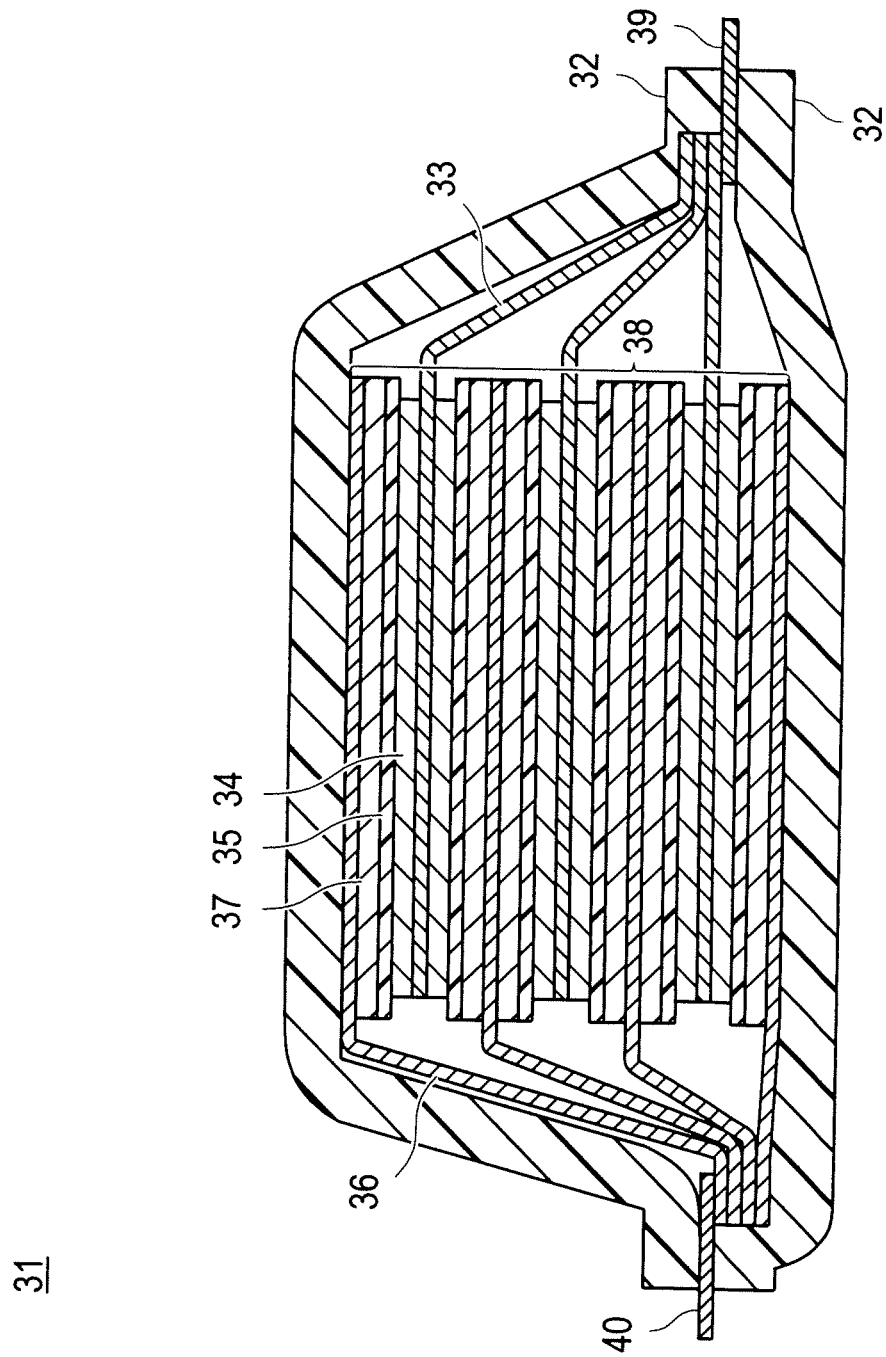
FIG. 4 shows a cross-sectional schematic diagram of a non-bipolar type and flat type (laminate type) of non-aqueous electrolyte lithium-ion secondary battery.

FIG. 4 shows a cross-sectional schematic diagram of a non-bipolar type and flat type (laminate type) of non-aqueous electrolyte lithium-ion secondary battery. The lithium-ion secondary battery 31 shown in FIG. 4 has a structure in which by using a polymer-metal composite laminated film as a battery exterior material 32 and by bonding all of peripheral part thereof by heat-sealing, a power generation element 38 laminated with a positive electrode plates composed of positive electrode collectors 33 with positive electrode active material layers formed on both sides thereof, electrolyte layers 35, and negative electrode plates composed of negative electrode collectors 36 with negative electrode active material layers 37 formed on both sides thereof (one side for the top layer and the bottom layer of a power generation element) is housed and sealed tightly. In addition, the secondary battery also has a structure in which a positive electrode (terminal) lead 39 and a negative electrode (terminal) lead 40, each of which is connected to each electrode plate (positive electrode plate or negative electrode plate), are attached to the positive electrode collectors 33 or the negative electrode collectors 36 of each electrode plate by ultrasonic welding, resistance welding, or the like, shut in the heat-sealed section, and chop out of the battery exterior material 32.

Figure 5:
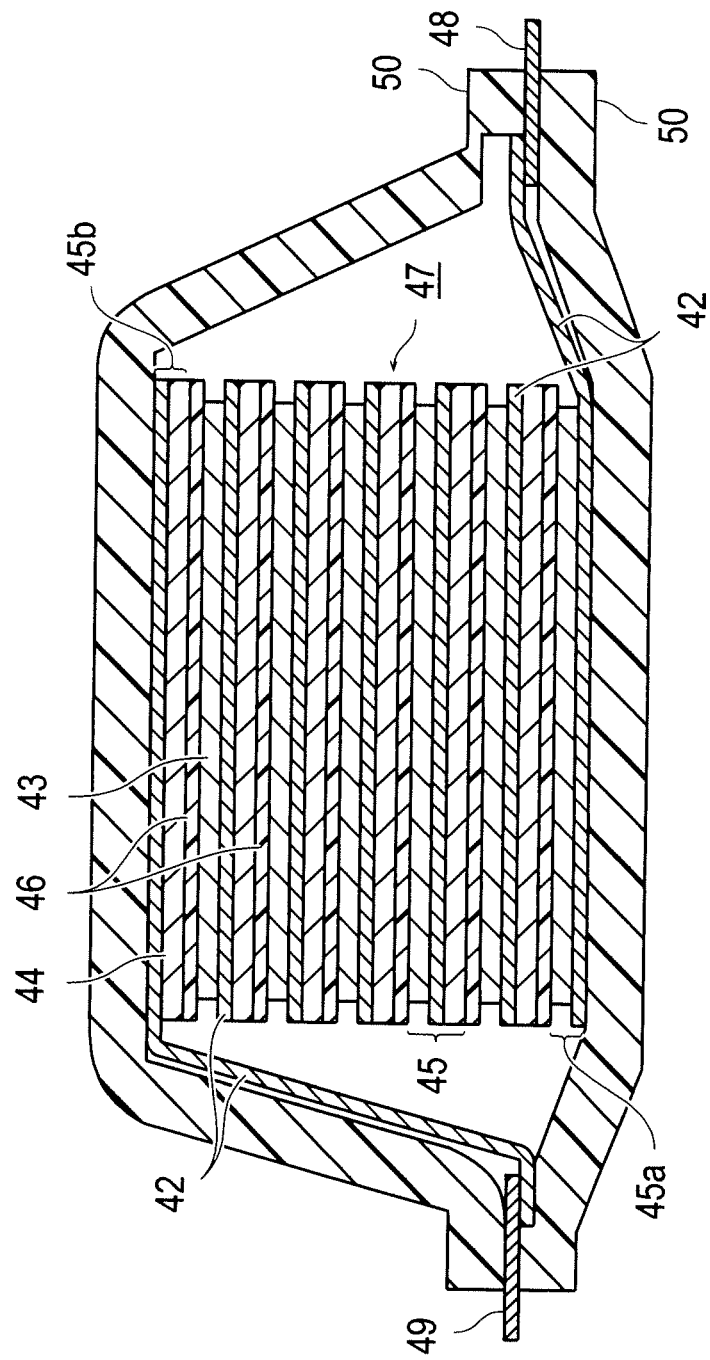
FIG. 5 shows a cross-sectional schematic diagram illustratively representing total structure of a bipolar type of non-aqueous electrolyte lithium-ion secondary battery.

FIG. 5 shows a cross-sectional schematic diagram, which schematically expresses overall structure of a bipolar type of non-aqueous electrolyte lithium-ion secondary battery (hereinafter, simply referred to as bipolar battery). As shown in FIG. 5, in bipolar battery 41, a bipolar electrode 45 is composed of one sheet or two or more sheets of collectors 42 and has a positive electrode active material layer 43 on one side thereof and a negative electrode active material layer of the present invention 44 on another side thereof. A plurality of bipolar electrodes 45 are arranged so as to make a positive electrode active material layer 43 and a negative electrode active material layer 44 of neighboring two bipolar electrodes 45 opposed each other with an electrolyte layer 46 sandwiched in between. Namely, the bipolar battery 41 comprises laminated electrode body (main body of the bipolar battery) 47 having a structure comprising a plurality of bipolar electrodes 45, which has a positive electrode active material layer 43 on one side of collector 42 and an negative electrode active material layer 44 on another side thereof, laminated via an electrolyte layer 46 in between. In addition, the electrodes of the top layer and the bottom layer, 45a and 45b, of such laminated electrode body 47, in which a plurality of bipolar electrodes 45 or the like are laminated, need not necessarily to have a bipolar electrode structure, and may have a structure, in which a positive electrode active material layer 43 or a negative electrode active material layer 44 required for collector 42 (or terminal plate) is arranged on one side only. Further, in bipolar battery 41, a positive electrode lead and an negative electrode lead, 48 and 49, are connected to each of the top and the bottom collectors 42.

In this connection, the number of the bipolar electrodes 45 (including electrodes 45a and 45b) to be laminated is adjusted corresponding to the required voltage. In addition, in bipolar battery 41, the number of lamination of the bipolar electrode 45 may be decreased so long as a sufficient output power can be secured even if a thickness of the battery is extremely reduced. Further, in the bipolar battery 41 of the present invention, in order to avoid shock and environmental deterioration from outside in use, it is preferably to have a structure, in which the section of laminated electrode body 47 is vacuum-sealed in battery exterior material (exterior package) 50 with electrode leads 48 and 49 being taken out of battery exterior material 50. The basic configuration of this bipolar battery 41 can be said to be a configuration, in which a plurality of laminated unit battery layers (electric cells) are connected in series. Since the bipolar type of non-aqueous electrolyte lithium-ion secondary battery is basically similar to the non-bipolar type of non-aqueous electrolyte lithium-ion secondary battery, except that electrode structure thereof differs from each other, each constituent will be collectively explained below.

[Collector]

The collector to be used in the present invention is not particularly limited, and conventionally known collector can be utilized. For example, aluminum foil, stainless-steel (SUS) foil, nickel-aluminum cladding material, copper-aluminum cladding material, material plated with combination of these metals, or the like can be preferably used. In addition, a collector, in which aluminum is coated on the surface of a metal, may be used. Further, in some cases, a collector made by laminating two or more kinds of metal foils can be used. When a composite collector is used, as a material for the positive electrode collector, for example, a conductive metal such as aluminum, aluminum alloy, SUS, titanium, and the like can be used, and aluminum is particularly preferable. On the other hand, as a material for the negative electrode collector, for example, a conductive metal such as copper, nickel, silver, SUS, and the like can be used, and SUS, nickel, and the like are particularly preferable. Further, in the composite collector, the positive electrode collector and the negative electrode collector may be electrically connected to each other directly or via a conductive intermediate layer consisting of the third material. Further, as the positive electrode collector or the negative electrode collector, besides a flat plate (foil), a collector composed of a lath plate, that is, a plate in which network spaces have been formed by expanding a palate having cut lines, can be used. Thickness of the collector is not particularly limited, but generally around 1 to 100 μm.

[Positive Electrode Active Material Layer]

Since constituent material of the positive electrode active material layer has already been explained in the positive electrode material of the present invention, explanation here is omitted.

Thickness of the positive electrode active material layer is not particularly limited, and should be determined in consideration of intended use of the battery (output-power-oriented, energy-oriented, etc.) and ion-conducting property. Thickness of general positive electrode material layers is around 1 to 500 μm, and the thickness in this range can be sufficiently used even in the present invention. However, desirably the thickness is particularly in a range from 4 to 60 μm to express efficiently the function possessed by the positive electrode material of the present invention.

[Negative Electrode Material Layer]

The negative electrode material layer contains an negative electrode active material. Besides this, a conductive auxiliary agent to improve electronic conductive property, a binder, an electrolyte-supporting salt (lithium salt) to improve ion-conducting property, a polymer gel or a solid electrolyte (host polymer, electrolytic solution, etc.) can be contained. Since the negative electrode active material is basically similar to the content described in the section of "positive electrode material for non-aqueous electrolyte lithium-ion battery" except the kind of negative electrode active material, explanation here is omitted.

As the negative electrode active material, the negative electrode active materials used in the conventionally known lithium-ion battery of solution system can be used. Specifically, the negative electrode active material is desirably an negative electrode active material containing, as a main component, at least one kind selected from the carbon materials such as natural graphite, artificial graphite, amorphous carbon, coke and mesophase pitch-based carbon fiber, graphite, hard carbon which is amorphous carbon, and the like, but not particularly limited thereto. Besides these materials, metal oxides (in particular, transition metal oxides, specifically titanium oxide), composite oxides of metal (in particular, transition metal, specifically titanium) and lithium, and the like can be used.

[Non-Aqueous Electrolyte Layer]

In the present invention, any of (a) separator containing impregnated electrolytic solution, (b) polymer gel electrolyte (separator may be included), and (c) polymer solid electrolyte (separator may be included) can be applied depending on the intended use.

(a) Separator Impregnated with Electrolytic Solution

As for the electrolytic solution to be impregnated into the separator, since those similar to the electrolytic solution (electrolyte salt and plasticizer) to be contained in the polymer gel electrolyte in the section of "positive electrode material for non-aqueous electrolyte lithium-ion battery" of the present invention already described above can be used, explanation here is omitted. One suitable example of the electrolytic solution is a solution, which is made by using at least one compound from $LiClO_4$, $LiAsF_6$, $LiPF_5$, LiBOB (lithium bis(oxalate)borate), $LiCF_3SO_3$ and $Li(CF_3SO_2)_2$, as an electrolyte, and at least one compound from ethylene carbonate (EC), propylene carbonate, diethyl carbonate (DEC), dimethyl carbonate, methyl ethyl carbonate, 1,2-dimethoxyethane, 1,2-diethoxyethane, tetrahydrofuran, 1,3-dioxolan and γ-butyrolactone, as a solvent, and dissolving said electrolyte in said solvent so that concentration of the electrolyte is adjusted to be 0.5 to 2 mole/liter. However, the electrolytic solution of the present invention should not be limited thereto.

The separator is not particularly limited, and those conventionally known can be used. For example, a porous sheet consisting of a polymer, which can absorb and hold the electrolytic solution (for example, polyolefin-based micro-porous separator, etc.), non-woven fabric separator, and the like, can be used. The polyolefin-based micro-porous separator has a property that the separator is stable to organic solvents, and hence a superior effect that the separator can suppress reactivity with an electrolyte (electrolytic solution) at low level.

Material for the porous sheet of the polyolefin-based micro-porous separator includes, for example, polyethylene (PE), polypropylene (PP), a laminated body having trilaminar structure of PP/PE/PP, polyimide, and the like.

As material for non-woven fabric separator, conventionally known materials such as cotton, rayon, acetate, nylon, polyester, polyolefin such as polypropylene and polyethylene, polyimide, aramid, and the like can be used, and the material is used alone or in combination of 2 or more kinds depending on the intended use.

In addition, bulk density of the non-woven fabric is not particularly limited so long as sufficient battery characteristics can be obtained by the polymer gel electrolyte impregnated. Namely, too high bulk density of the non-woven fabric makes a ratio of non-electrolyte material in the electrolyte layer too high and could impair ion-conducting property, etc. in the electrolyte layer.

Thickness of the separator (including non-woven fabric separator) cannot be specified unambiguously, because it varies depending on application, but in the applications to secondary battery for driving motor of electric vehicle (EV), hybrid electric vehicle (HEV), etc., the thickness is desirably 5 to 200 µm. Due to the thickness of separator being in such range, increases of retention property and resistance can be prevented. Further, the thickness in such range gives effects of mechanical strength in thickness direction and securement of high output power, because of the reasons that short circuit occurring by clogging of separator with fine particles can be prevented and that narrow distance between electrodes is desirable for the high output power. Still further, when a plurality of batteries is connected, since electrode area increases, a thick type of separator within the above range is desirably used to improve reliability of the battery.

Pore size of the separator (polyolefin-based micro-porous separator, etc.) is desirably 1 µm or less at a maximum (pore size is usually around several ten nm). Due to the average pore size being in such range, "shut down phenomenon", in which fine pores are closed because of melting of separator by heat, occurs quickly, resulting in improved reliability in abnormal time and giving an effect of improved heat resistance. Namely, when battery temperature goes up due to overcharge (in an abnormal time), "shut down phenomenon", in which fine pores are closed because of melting of separator, occurs quickly, and it becomes impossible for Li-ion to pass through from the positive electrode (+) side to the negative electrode (−) side of battery (electrode). This makes further charge impossible. Therefore, overcharge cannot be done, and the problem of overcharge can be solved. As a result, heat resistance (safety) of battery is improved as well as opening of heat-seal section of battery exterior material due to emission of gas is prevented. In this connection, the average pore size of separator can be calculated as an average size by observing the separator by a scanning electron microscope, etc., and statistically processing the picture by an image analyzer, etc.

Porosity of the separator (polyolefin-based micro-porous separator, etc.) is desirably 20 to 60%. The porosity of separator in the above range gives effects that both of output power and reliability can be secured because of prevention of output power decrease due to resistance of electrolyte (electrolytic solution) and prevention of short-circuit caused by passing of fine particles through vacancy (fine pore) of separator. In this connection, the porosity of separator is a value calculated as a volume ratio from the density of raw material resin and the density of separator as final product.

Further, porosity of the non-woven fabric separator is preferably 50 to 90%. Porosity less than 50% impairs retention property for electrolyte, and porosity over 90% results in insufficient strength.

Amount of electrolytic solution to be impregnated into the separator is within a range of retention capacity of the separator, but electrolytic solution over said range of retention capacity may be impregnated. Since leak of electrolytic solution from electrolyte layer can be prevented by filling a resin into electrolyte seal section, electrolytic solution can be impregnated within the retention capacity range of said electrolyte layer. Said electrolytic solution can be impregnated into separator by conventionally known method, for example, after filling by a vacuum injection method, etc., and then sealed up completely.

(b) Polymer Gel Electrolyte and (c) Polymer Solid Electrolyte

As the polymer gel electrolyte and polymer solid electrolyte, those similar to the polymer gel electrolyte and polymer solid electrolyte already explained in the section of "positive electrode material for non-aqueous electrolyte lithium-ion battery" of the present invention can be used. Therefore, explanation here is omitted.

In addition, in the non-aqueous electrolyte layers of the above (b) and (c), separator may be included. Namely, the electrolyte layer may be constituted in a form in which polymer gel electrolyte or polymer solid electrolyte is impregnated in or supported by the separator. In this case, the polymer gel electrolyte and the polymer solid electrolyte similar to those already explained in the section of "positive electrode material for non-aqueous electrolyte lithium-ion battery" of the present invention can be used. Therefore, explanation here is omitted. Further, the separator similar to one already explained in the section of the above (a) "Separator impregnated with electrolytic solution" can be used. Therefore, explanation here is omitted.

In this connection, the non-aqueous electrolyte layers of the above (a) to (c) may be used in combination within a battery.

In addition, the polymer electrolyte can be contained in non-aqueous electrolyte layer of polymer gel electrolyte or polymer solid electrolyte, positive electrode active material layer and negative electrode active material layer, and the same polymer electrolyte may be used for all layers or a different polymer electrolyte may be used for each layer.

Meanwhile, host polymer for the polymer gel electrolyte currently preferably used is a polyether-based polymer such as PEO and PPO. For this reason, resistance against oxidation in the positive electrode side under a high temperature condition is weak. Consequently, when a positive electrode material having high oxidation-reduction potential is used, the capacity of negative electrode (active material layer) is preferably less than the capacity of positive electrode (active material layer), which is in an opposed position through the polymer gel electrolyte layer. The capacity of negative electrode (active material layer) less than the capacity of opposed positive electrode (active material layer) can prevent over-rise in the positive electrode potential at a late stage of charge. In this connection, the capacity of positive electrode (active material layer) or negative electrode (active material layer) can be calculated from manufacturing conditions thereof as a theoretical capacity in manufacturing the positive electrode (active material layer) or the negative electrode (active material layer). The capacity may be obtained by measuring directly on a finished product using a measuring tool. However, since the capacity of negative electrode (active material layer) less than the capacity of opposed positive electrode (active material layer) could cause to impair endurance of the battery due to over-decreased negative electrode potential, it is necessary to give attention to charge or discharge potential. Attention should be paid so as not to impair endurance, for example, by setting average charge potential of a cell (electric cell layer) at a proper value against the oxidation-reduction potential of positive electrode active material to be used.

Thickness of the electrolyte layer constituting battery is not particularly limited. However, in order to obtain a compact battery, thickness of the electrolyte is preferably as thin as possible within a range in which a function as an electrolyte can be secured, and desirably 5 to 200 μm.

[Insulation Layer]

Insulation layer is mainly used in the case of the bipolar type battery. This insulation layer is formed surrounding each electrode for the purpose to prevent contact of neighboring collectors or short-circuit occurring by slight irregularity in the ends of laminated electrodes. In the present invention, the insulation layer may be provided surrounding each electrode, if necessary. This is for the reason that when the battery is utilized as a power source for driving vehicle or an auxiliary power source, short-circuit caused by electrolytic solution (liquid shunt) must be completely prevented. Further, vibrations and impacts are applied to battery over a prolonged period. Therefore, from the viewpoint of prolonged battery life, it is desirable to provide the insulation layer, in order to secure prolonged reliability and safety, and provide a high quality of and a large capacity of power source.

Said insulation layer may be a layer having insulating property, sealing property for leak and seeping of gel electrolyte, sealing property for dropout of solid electrolyte, and further sealing property (hermetically sealing property) for moisture permeation from outside, heat resistance under the battery operative temperature, and the like. For example, epoxy resin, rubber, polyethylene, polypropylene, polyimide, and the like can be used, and epoxy resin is preferable from the viewpoints of corrosion resistance, chemical resistance, easiness in manufacturing (film-forming property), economical efficiency, etc.

[Positive Electrode and Negative Electrode Terminal Plates]

The positive electrode and the negative electrode terminal plates may be used, if necessary. For example, in the case of some laminated (coiled) structure of a bipolar type of lithium-ion battery, an electrode terminal may be taken out directly from the outermost collector. In this case, the positive electrode and the negative electrode plates need not be used (refer to FIG. 4).

When the positive electrode and the negative electrode plates are used, they have a function as a terminal and are preferably as thin as possible from the view point of reduction in thickness. However, since all of electrode, electrolyte and collector, which are in a laminated form, are weak in mechanical strength, the positive electrode and the negative electrode plates desirably have sufficient strength to nip and support the laminate from both sides. Further, in view of controlling internal resistance at the terminal section, thickness of the positive electrode and the negative electrode plates is generally around 0.1 to 2 mm.

As material of the positive electrode and the negative electrode plates, those used for the conventionally known lithium-ion battery can be used. For example, aluminum, copper, titanium, nickel, stainless steel (SUS), alloys thereof, and the like can be utilized. Aluminum is preferably used from the viewpoints of corrosion resistance, easiness in manufacturing, cost efficiency, etc.

As the materials for the positive electrode terminal plate and the negative electrode terminal plate, the same material or different materials may be used. Further, these positive electrode and negative electrode terminal plates may be one, in which a plurality of layers of different materials is laminated.

[Positive Electrode and Negative Electrode Leads]

As for the positive electrode and the negative electrode leads, those similar to the lead used for the conventionally known lithium-ion battery of a bipolar type as well as a non-bipolar type, can be used. In this connection, the part taken out of the battery exterior material (battery case) is preferably covered with a thermally insulating heat shrink tube, etc., so as not to influence a product (for example, auto parts, especially electronics device etc.) by getting into touch with peripheral devices and wirings to cause a short.

[Battery Exterior Material (Battery Case)]

Not only in a bipolar type, but in all types of lithium-ion batteries, the laminated battery body as a main body of battery or the whole body of coiled battery is desirably housed in a battery exterior material or a battery case, to avoid impact from outside and environmental deterioration in use. From the viewpoint of weight reduction, it is preferable to have a structure, in which a laminated battery body is housed and tightly sealed by using the conventionally known battery exterior materials such as a polymer-metal composite laminated film in which both sides of a metal (including an alloy) such as aluminum, stainless steel, nickel, copper, and the like are covered with an insulating material (preferably a heat-resistant insulating material) such as polyethylene film and the like, and joining a part or the whole of peripheral section thereof by heat-seal. In this case, the positive electrode and negative electrode leads may have a structure in which the leads are sandwiched with the heat-sealed section and exposed from the battery exterior material. Further, it is preferable to use a polymer-metal composite laminated film having superior heat conductance, and the like from the viewpoints that the film can transfer heat efficiently from the heat source of automobile to heat up rapidly inside of the battery up to the operational temperature of battery. The polymer-metal composite laminated film is not particularly limited, and the conventionally known films, which are obtained by arranging a metal film between polymer films and laminating the whole to combine together, can be used. Specific examples include, for example, those which are obtained by arranging an exterior protective layer (the outermost layer of the laminate) consisting of a polymer film, a metal layer, and a heat-sealable layer (the innermost layer of laminate) consisting of a polymer film in this order, and laminating the whole to combine together. More specifically, the polymer-metal composite laminated film to be used as an exterior material is a film, which is made by forming firstly heat resistant insulating resin films as a polymer film on the both sides of the metal film, and laminating a heat-sealable insulating film on the heat resistant insulating resin film at least on one side. Such laminated film can form a heat-sealed section by heat-sealing by a proper method and joining the heat-sealable insulating film section by melting. As the metal film, aluminum film and the like can be exemplified. In addition, as the insulating resin film, polyethylene terephthalate film (heat resistant insulating film), nylon film (heat resistant insulating film), polyethylene film (heat-sealable insulating film), polypropylene film (heat-sealable insulating film), and the like can be exemplified. However, the exterior material of the present invention should not be limited thereto. Such laminated film can perform easily and certainly heat-seal-joining of a pair of or a sheet (pouched) of laminated film utilizing a heat-sealable insulating film by ultrasonic welding, etc. In this connection, in order to improve prolonged reliability at a maximum, the metal films, which are components of the laminated sheet, may be joined to each other directly. To remove or destroy the heat-sealable resin present between the metal films and join the metal films, ultrasonic welding can be used.

Next, as for applications of the non-aqueous electrolyte lithium-ion secondary battery of the present invention, the battery can be suitably used for power source or auxiliary power source for driving vehicle, which requires high energy density and high output power density, for example, as a large capacity of power source for electric vehicle (EV), hybrid electric vehicle (HEV), fuel cell vehicle, hybrid fuel cell vehicle, etc. In these cases, it is desirable to use an assembled battery, which is constituted by connecting a plurality of non-aqueous electrolyte lithium-ion batteries of the present invention. Namely, in the present invention, an assembled battery (sub-module for vehicle) can be made using a plurality of the non-aqueous electrolyte lithium-ion batteries by at least one of parallel connection, series connection, parallel-series connection or series-parallel connection. This method enables to correspond to the requirements in capacity and voltage for each of various vehicles, by combining basic batteries. As a result, it becomes possible to make design selection of required energy and output power easy. Consequently, this method makes designing and manufacturing of different battery for each of various vehicles unnecessary, and enables a large-scale production of a basic battery and hence cost reduction by mass production. Hereinafter, a representative embodiment of said assembled battery (sub-module for vehicle) is explained briefly referring to drawings.

FIG. 6 shows pattern diagrams of an assembled battery (42V, 1 Ah) connecting the bipolar batteries (24V, 50 mAh) of the present invention in 2 series and 20 parallels. Tabs of the parallel section are connected with bus-bar of copper, and in series section, tabs 48 and 49 are connected by vibration welding. Positive and negative terminals are constructed by connecting terminals of the series section to terminals 62 and 64. On the both sides of the battery, detection tabs to detect a voltage of each layer of the bipolar battery 41 are taken out, detection line 53 from them are taken out in front of the front section of the assembled battery 51. More specifically, assembled battery 51 shown in FIG. 6 is formed by connecting 5 sheets of bipolar batteries 41 in parallel by bus-bar 56, further connecting in series 2 sheets of electrode tabs, each having 5 sheets of bipolar batteries 41 in parallel, laminating 4 layers of these sets in parallel and connecting with bus-bar 58, and housing in a metal-made assembled battery case 55. In such way, by connecting arbitrary number of bipolar batteries 41 in series and parallel, assembled battery 51 capable of corresponding to desired current, voltage and capacity can be provided. In said assembled battery 51, positive electrode terminal 62 and negative electrode terminal 64 are formed in the front section on the side face of assembled battery case 55, and after the batteries are connected in series and parallel, for example, each bus-bar 56 and each of positive electrode terminal 62 or negative electrode terminal 64 are connected by terminal lead 59. In addition, in said assembled battery 51, detection tab terminal 54 to monitor a battery voltage (terminal voltage of each electric cell layer or bipolar battery) is installed in the front section on side face of metal-made assembled battery case 55, where positive electrode terminal 62 and negative electrode terminal 64 are provided. And all of voltage detection tabs 60 of bipolar battery 41 are connected to detection tab terminal 54 through detection line 53. Further, in the bottom section of the assembled battery case 55, exterior elastic body 52 is attached to maintain the distance between battery assemblies 51 and improve vibration-proofing property, impact resistance, insulating property, radiating property, and the like, when a composite assembled battery is formed by laminating a plurality of battery assemblies 51.

In addition, in this assembled battery 51, besides the detection tab terminal 54, various measuring devices and control devices may be provided. Further, connection of electrode tabs (48, 49) or detection tab 60 and detection line 53 of bipolar battery 1 may be performed by ultrasonic welding, heat welding, laser welding or electron beam welding, or using bus-bars 56, 58 like a rivet, or using a caulking technique. Further, connection of bus-bars 56, 58 and terminal lead 59, etc. may be performed by using ultrasonic welding, heat welding, laser welding or electron beam welding, and is not particularly limited.

For exterior elastic body 52, the materials similar to the resin group used in the battery of the present invention can be used, but the elastic body is not limited thereto.

In addition, the assembled battery of the present invention may include those in which a bipolar type non-aqueous electrolyte lithium-ion battery of the present invention (hereinafter, simply referred to as bipolar battery) and a non-aqueous electrolyte lithium-ion secondary battery of the present invention having the same positive and negative electrode materials to those of said bipolar type battery and having the same voltage by connecting the constituent number of said bipolar batteries in series (hereinafter, simply referred to as non-bipolar type battery), in parallel. Namely, as a battery forming an assembled battery, the bipolar battery of the present invention and the non-bipolar type battery may coexist (however, all batteries are not necessarily the battery of the present invention). By employing such configuration, an assembled battery which can cover the weak points of each type of battery, can be made by combining the output-power-oriented bipolar battery and the energy-oriented non-bipolar type battery, and weight and size can be reduced. Ratio of the bipolar battery and the non-bipolar type battery to be used jointly may be determined depending on safety performance and output performance required for the assembled battery.

Figure 7:
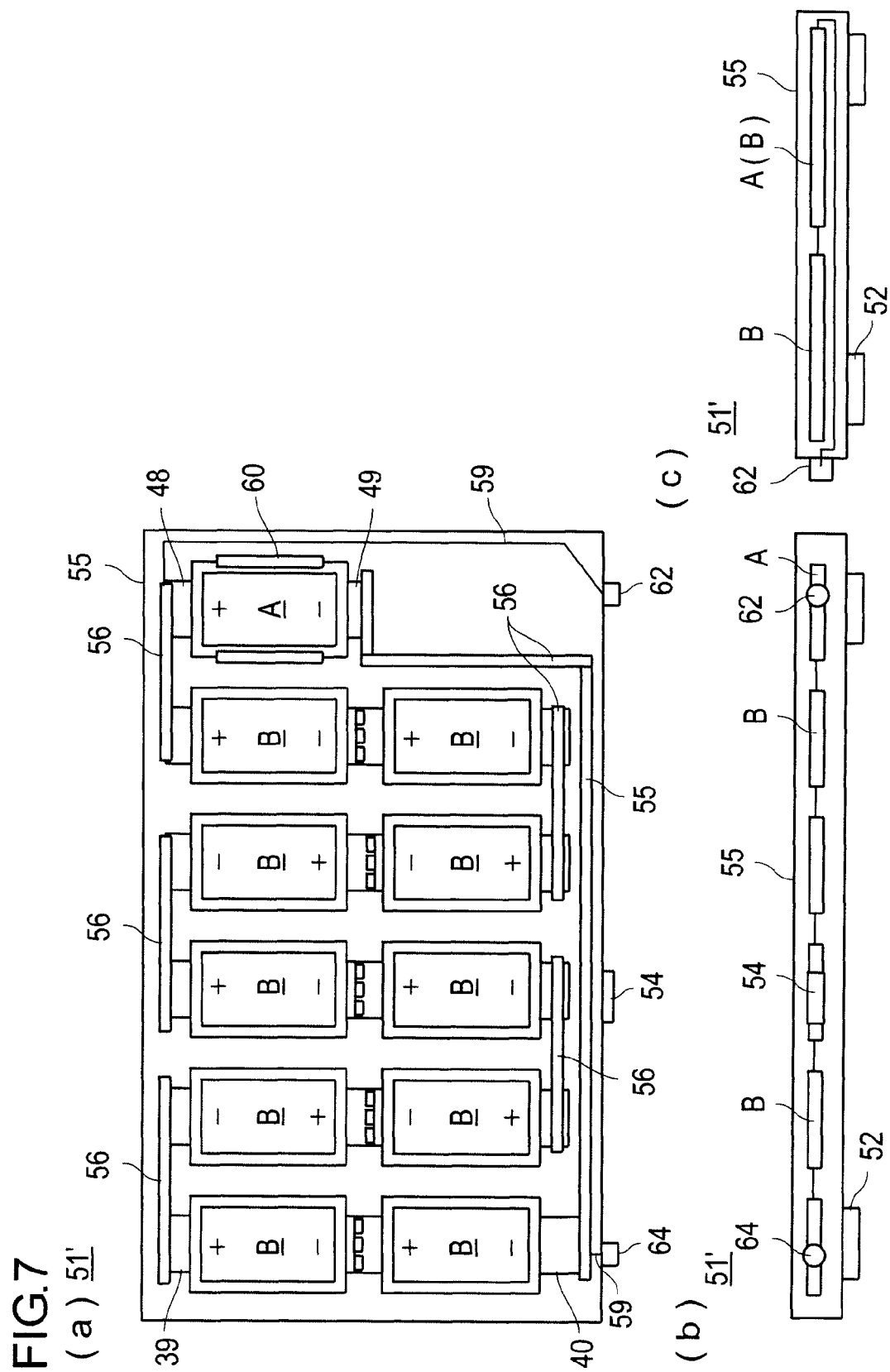
FIG. 7 are drawings showing an example of an assembled battery connecting in parallel a bipolar battery A of the present invention and 10 series of non-polar type lithium-ion secondary batteries B of the present invention.

FIG. 7 shows an assembled battery made by connecting bipolar battery A (42 V, 50 mAh) and 10 series of non-bipolar type battery B (4.2 V, 1 Ah) in parallel. Bipolar battery A and non-bipolar type battery B have the same voltage, and these sections are connected in parallel. This assembled battery 51' has such a structure that bipolar battery A bears the part of output power, and non-bipolar type battery B bears the part of energy. This is a very effective means for assembled battery, which is difficult to satisfy both of output power and energy. In this assembled battery tabs of the parallel connection section and the series connection section of non-bipolar type batteries B lying side-by-side in horizontal direction in the drawing are connected with copper bus-bar 56, and the series connection sections of general batteries B lying in the vertical direction in the drawing are connected by vibration welding of tabs 39, 40. Ends of parallel connection section of non-bipolar type battery B and bipolar battery A are connected to terminals 62, 64 to construct positive and negative terminals. Configuration of the assembled battery 51' is similar to that of the assembled battery 51 in FIG. 6, except that detection tabs 60 to detect voltage of each layer of bipolar battery A are taken out on the both side of bipolar battery A, and their detection lines (not shown in FIG. 7) are taken out in the front section of assembled battery 51', the same member is designated by the same symbol. More specifically, the assembled battery 51' shown in FIG. 7 is formed by connecting in series 10 sheets of non-bipolar type batteries by bus-bar 56 and vibration welding in order from the end, and further, connecting bipolar battery A and both ends of non-bipolar type batteries connected in series in parallel by bus-bar 56, respectively, and housing in a metal-made assembled battery case 55. In such way, by connecting arbitrary number of bipolar batteries A in series and parallel, assembled battery 51' capable of corresponding to desired current, voltage and capacity can be provided. In said assembled battery 51', positive electrode terminal 62 and negative electrode terminal 64 are also formed in the front section on the side face of metal-made assembled battery case 55, and after the batteries A and B are connected in series and parallel, for example, each bus-bar 56 and each of positive electrode terminal 62 or negative electrode terminal 64 are connected by terminal lead 59. In addition, in said assembled battery 51', detection tab terminal 54 to monitor a battery voltage (terminal voltage of each electric cell layer of bipolar battery A or bipolar battery A and non-bipolar type battery B) is installed in the front section on side face of metal-made assembled battery case 55, where positive electrode terminal 62 and negative electrode terminal 64 are provided. And all of detection tabs 60 of each bipolar battery A (or non-bipolar type battery B) are connected to detection tab terminal 54 through detection line (not shown in the drawing). Further, in the bottom section of assembled battery case 55, exterior elastic body 52 is attached to maintain the distance between battery assemblies 51' and improve vibration-proofing property, impact resistance, insulating property, radiating property, and the like, when a composite assembled battery is formed by laminating a plurality of battery assemblies 51'.

Further, configuration of the assembled battery of the present invention is not particularly limited, and the assembled battery may be constructed by forming a first assembled battery unit by connecting the bipolar batteries in series and parallel as well as forming a second assembled battery unit having the same voltage as the terminal voltage of this first assembled battery unit formed by connecting secondary batteries different from the bipolar battery in series and parallel, and connecting these first assembled battery unit and second assembled battery unit in parallel.

Furthermore, other constituent requirements are not particularly limited, and constituent requirements similar to those of the existing non-bipolar type lithium-ion secondary battery can be applied as appropriate. Since component elements and manufacturing technology for the conventionally known assembled battery are utilized, explanation here is omitted.

Next, composite assembled battery (assembled battery for vehicle), which is made by connecting at least two units of the assembled battery (sub-module for vehicle) in series, parallel or series and parallel, enables to correspond to requirements of battery capacity and output power for each intended use at a considerably low cost without additionally manufacturing another assembled battery. Namely, the composite assembled battery of the present invention is characterized by connecting in complex at least two units of assembled battery (those composed only of the bipolar batteries or the non-bipolar type of batteries of the present invention, and composed of the bipolar batteries and the non-bipolar type of batteries of the present invention) in series, parallel, or series and parallel. Therefore, by manufacturing a basic assembled battery and combining the basic battery assemblies to make a composite assembled battery, specifications of composite assembled battery can be tuned.

According to this method, manufacturing of many types of battery assemblies having different specifications becomes unnecessary, and cost of the assembled battery can be reduced.

Figure 8:
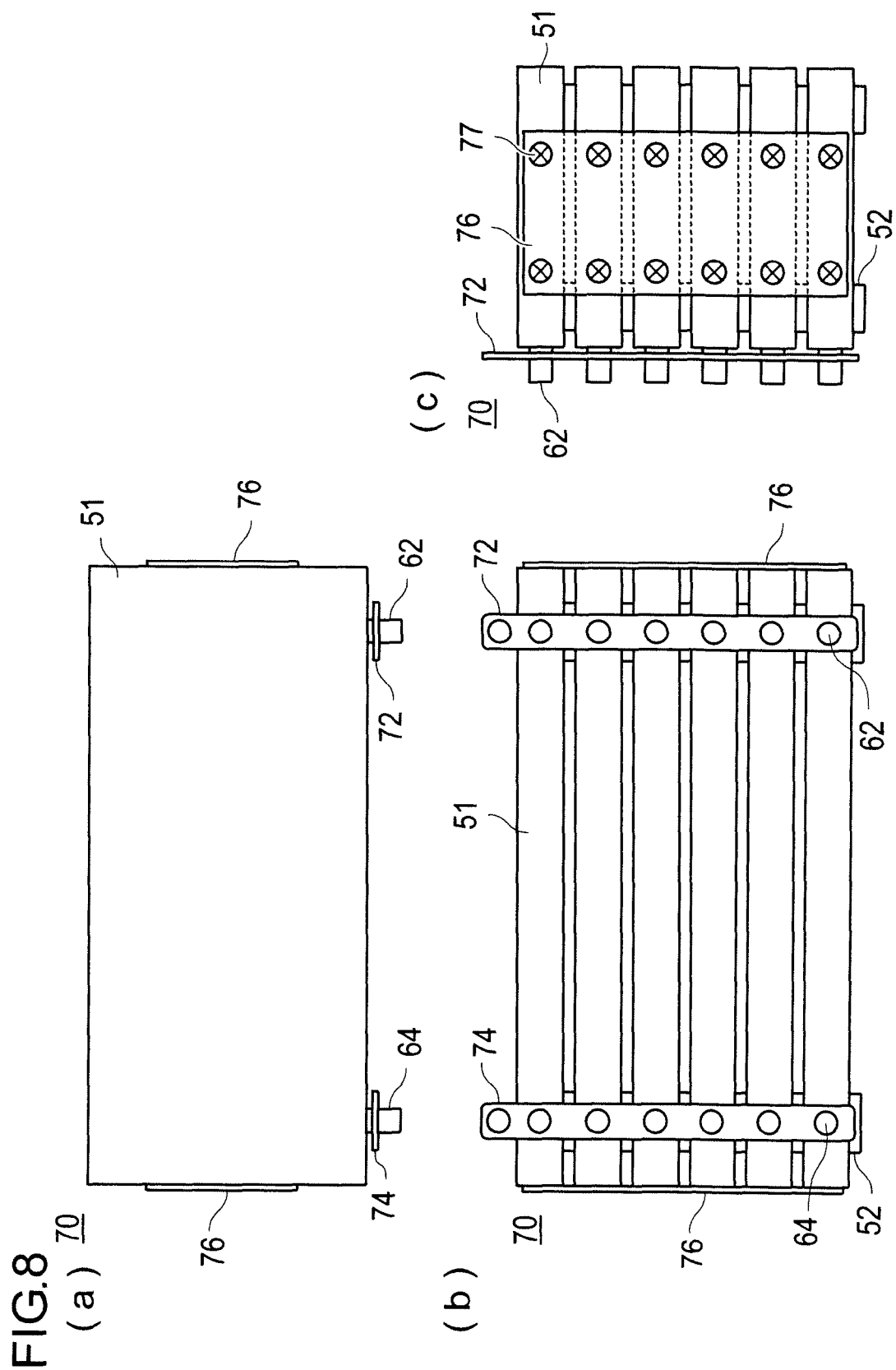
FIG. 8 is drawings showing an example of a composite battery assembly of the present invention.

As a composite assembled battery, FIG. 8 shows pattern diagrams of a composite assembled battery (42 V, 6 Ah) made by connecting composite assembled battery (42V, 1 Ah) by using the bipolar batteries described in FIG. 6 in 6 parallel. Each assembled battery constituting the composite assembled battery is unified by using connecting plates and fixing screws, and an elastic body is provided between each assembled battery to form a vibration-proofing structure. In addition, tabs of the battery assemblies are connected with bus-bar. Namely, as shown in FIG. 8, composite assembled battery 70 is made by connecting 6 units of assembled battery 51, that is, by electrically connecting each tab of assembled battery 51 (positive electrode terminal 62 and negative electrode terminal 64) provided on the lid body of each assembled battery case 55 using assembled battery positive electrode terminal connecting plate 72 and assembled battery negative electrode terminal connecting plate 74, which are plate-like bus-bars and have external positive electrode terminal section and external negative electrode terminal section. Further, each of battery assemblies 51 is connected by fixing connecting plate 76 having an opening corresponding to the fixing screw hole section to each screw hole section provided on the both side faces of each assembled battery case 55 using fixing screw 77. Further, positive electrode terminal 62 and negative electrode terminal 64 of each assembled battery 51 are each protected by a positive electrode and a negative electrode insulation cover, and identified by coloring in proper colors, for example, in red color and blue color. Further, between battery assemblies 51, more specifically, in the bottom section of assembled battery case 55, exterior elastic body 52 is provided to form a vibration-proofing structure.

In addition, in the composite assembled battery, each of plural battery assemblies constituting this is desirably connected in a detachable manner. This is because the following reason. In the composite assembled battery, in which a plurality of battery assemblies are connected in series and parallel in such manner, even if a part of batteries or battery assemblies breaks down, the breakdown can be repaired only by replacing the failure part.

Further, the vehicle of the present invention is characterized by mounting the assembled battery and/or the composite assembled battery. This enables to obtain a light and compact battery, and meet the requirement for a space-oriented vehicle. By reducing a space for battery, weight reduction of vehicle can be also achieved.

Figure 9:
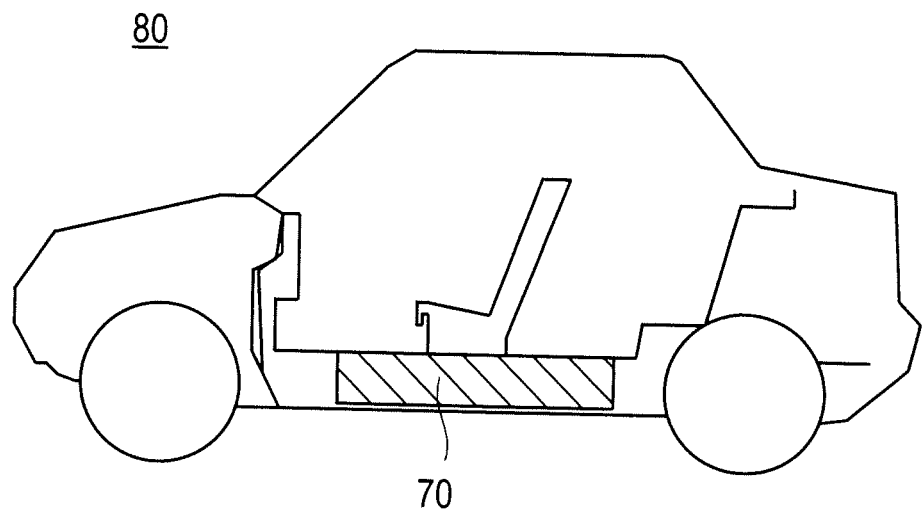
FIG. 9 is a pattern diagrams showing an electric vehicle in which a composite assembled battery is mounted.

As shown in FIG. 9, when composite assembled battery 70 is mounted on a vehicle (for example, electric vehicle, etc.), the battery is mounted under the seat in the central section of vehicle body of electric vehicle 80. By mounting under the seat, car interior space and trunk room can be widely utilized. In this connection, location for battery to be mounted is not limited to under the seat, but may be under the floor of vehicle, backside of the seat, lower part of the rear trunk room or the engine room in the front part of vehicle.

Furthermore, in the present invention, not only a composite assembled battery, but also an assembled battery may be mounted on a vehicle, or composite assembled battery and an assembled battery may be mounted in combination, depending on application. Further, vehicle, on which the composite assembled battery or the assembled battery of the present invention can be mounted as a power source for driving or an auxiliary power source, is preferably the above-described electric vehicle, fuel cell vehicle, or hybrid car thereof, but not limited thereto. Still further, vehicle, on which the assembled battery or the composite assembled battery of the present invention can be mounted, for example, as a power source for driving or an auxiliary power source, is preferably electric vehicle, hybrid electric vehicle, fuel cell vehicle, hybrid fuel cell vehicle, etc., but not limited thereto.

EXAMPLES

Hereinafter, the content of the present invention will be explained referring to Examples and Comparative Examples; however, the present invention is not limited to these Examples.

1. Manufacturing of Positive Electrode

In Examples 1 to 7, 22 to 27, 40 to 46 and 61 to 67, and Comparative Examples 4 to 5 shown in Tables 1, 4, 7 and 10, lithium hydroxide hydrate and nickel hydroxide containing Co (15% by mass), Al (3% by mass) and sulfur (2% by mass) were used, so that composition of lithium nickel composite oxide as a positive electrode active material becomes $LiNi_{0.82}Co_{0.15}Al_{0.03}O_2$. On the other hand, in Comparative Examples 1, and 13 shown in Tables 1, 7 and 10, lithium oxide, nickel oxide, cobalt oxide and aluminum oxide were mixed so that the ratio; Li:Ni:Co:Al=1:0.82:0.15:0.03 is satisfied, to obtain a lithium nickel composite oxide as a positive electrode active material having a composition of $LiNi_{0.82}Co_{0.15}Al_{0.03}O_2$.

In Examples 8 to 14, 28 to 33, 47 to 53 and 68 to 74 and Comparative Examples 6 to 7 shown in Tables 2, 5, 8 and 11, lithium hydroxide hydrate and spherical nickel hydroxide containing Co (30% by mass), Mn (30% by mass) and sulfur (2% by mass) were used, so that composition of lithium nickel composite oxide as a positive electrode active material becomes $LiNi_{0.34}Co_{0.33}Mn_{0.33}O_2$. On the other hand, in Comparative Examples 2, 11 and 14 shown in Tables 2, 8 and 11, lithium oxide, nickel oxide, cobalt oxide and manganese oxide were mixed so that the ratio; Li:Ni:Co:Mn=1:0.33:0.33:0.33 is satisfied, to obtain a lithium nickel composite oxide as a positive electrode active material having a composition of $LiNi_{0.34}Co_{0.33}Mn_{0.33}O_2$.

In Examples 15 to 21, 34 to 39, 54 to 60 and 75 to 81 and Comparative Examples 8 to 9, 12 and 15 shown in Tables 3, 6, 9 and 12, lithium hydroxide hydrate and spherical nickel hydroxide containing Co (30% by mass), Mn (30% by mass) and sulfur (2% by mass) were used, so that composition of lithium nickel composite oxide as a positive electrode active material becomes $LiNi_{0.5}Cu_{0.33}Mn_{0.5}O_2$. On the other hand, in Comparative Examples 3, 12 and 15 shown in Tables 3, 9 and 12, lithium oxide, nickel oxide, and manganese oxide were mixed so that the ratio; Li:Ni:Mn=1:0.5:0.5 is satisfied, to obtain a lithium nickel composite oxide as a positive electrode active material having a composition of $LiNi_{0.5}Mn_{0.5}O_2$.

In each Example, a prescribed amount of lithium hydroxide hydrate and a prescribed amount of spherical nickel hydroxide containing Co (30% by mass), Mn (30% by mass) and sulfur (2% by mass) (in the case of $LiNiCoAlO_2$, a prescribed amount of lithium hydroxide hydrate and a prescribed amount of nickel hydroxide containing Co (15% by mass), Al (3% by mass) and sulfur (2% by mass)) were heated from room temperature up to 300° C., and dehydrated in air for 24 hours. After that, the mixture was subjected to thermal decomposition at a temperature in a range from 300 to 500° C. for 8 hours (porosity of the secondary particle can be controlled by the thermal decomposition temperature), then calcined at a temperature in a range from 500 to 850° C. for 24 hours under the oxygen atmosphere while subjected to homogenization. In this connection, partial pressure of oxygen during the calcination was 0.1 to 1 atm. In this step, particles of lithium nickel composite oxide grow up. By adjusting the calcination temperature, shape, size and aspect ratio of primary particle, and ratio of orientation toward a certain direction of primary particles composing secondary particle; for example, a ratio of primary particle having different aspect ratios in which the longitudinal direction (the long side direction) is oriented along a certain direction such as the direction toward the center of secondary particle, can be controlled. A length of short side (L2) of the primary particle after the calcination was 0.01 to 2 µm. After calcination, temperature was sent down to room temperature within 5 minutes (quenched), while oxygen was passed through.

Average particle size of the resultant positive electrode active material particle was 5 µm.

In this connection, other elements can be added thereto by coprecipitating as a hydroxide. Alternatively, other elements can be added as a metal, an oxide, a nitrate salt or a sulfate salt instead of the hydroxide.

In Comparative Examples, the conventional solid phase process was used, in which an oxide was used as a raw material.

A slurry was prepared by mixing in a ratio of a positive electrode active material for each Example and Comparative Example obtained as described above (75% by mass), acetylene black as a conductive auxiliary agent (10% by mass), polyvinylidene fluoride as a binder (15% by mass), and adding N-methyl-2-pyrrolidone (NMP) as a solvent. The slurry was coated on an aluminum foil (thickness: 20 µm) as a positive electrode collector using an applicator, then dried by heating at around 80° C. in a vacuum dryer. After that, an electrode was punched out with a diameter of 15 mm, and dried under high vacuum at 90° C. for 6 hours. Thickness of the punched out positive electrode (positive electrode active material layer) was 50 µm.

2. Manufacturing of Negative Electrode

A slurry was prepared by mixing carbon of carbonaceous material as an negative electrode active material powder (85% by mass), acetylene black as a conductive auxiliary agent (8% by mass), vapor-phase growth carbon fiber (VGCF) (2% by mass), polyvinylidene fluoride as a binder (5% by mass), and adding N-methyl-2-pyrrolidone (NMP) as a solvent. The slurry was coated on a copper foil (thickness: 20 µm) as an negative electrode collector using an applicator, then dried by heating at around 80° C. in a vacuum dryer. After that, an electrode was punched out with a diameter of 16 mm, and dried under high vacuum at 90° C. for 6 hours. Thickness of the punched out negative electrode (negative electrode active material layer) was 80 µm.

3. Manufacturing and Evaluation of Battery

Using the positive electrode (Examples 1 to 81 and Comparative Examples 1 to 15 and the negative electrode (the same one for all Examples and Comparative Examples) manufactured as described above, each battery (laminated cell) was constructed. More specifically, the laminated cell was composed of a polypropylene-based micro-porous separator (average pore size of micro-pore: 800 nm, porosity:

35%, thickness: 30 μm) as a separator, and 1.0 M solution of LiPF$_6$ in EC+DEC as a non-aqueous electrolytic solution. Capacity balance of positive electrode and negative electrode were positive electrode control.

Just after manufacturing the cell, electricity was charged up to 4.1 V at 0.2 C in reduced current to positive electrode, and maintained at room temperature for 1 week. After that, internal resistance was measured by direct current, and 500 cycles of charges and discharges were repeated at 60° C. at a constant 1C current within the upper limit of 4.1 V and the lower limit of 2.5 V. When voltage reached the upper limit or the lower limit, a pause of 10 minutes was taken. After that, internal resistance was measured similarly to the initial stage. In addition, the cell was dismantled and the secondary particle in each Example and Comparative Example used as a positive electrode active material was observed to check an occurrence of cracking in the secondary particle. The resultant results are shown in Tables 1 to 12.

TABLE 1

As to LiNi$_{0.82}$Co$_{0.15}$Al$_{0.03}$O$_2$

| | L1/L2 | L1 (nm) | L2 (nm) | Calcination temperature (° C.) | Increasing rate of internal resistance | Cracking of secondary particle |
|---|---|---|---|---|---|---|
| Example 1 | 1.5 | 825 | 550 | 500 | 1.8 | No |
| Example 2 | 2.5 | 1,375 | 550 | 600 | 1.6 | No |
| Example 3 | 3.1 | 1,550 | 500 | 650 | 1.5 | No |
| Example 4 | 5.6 | 2,520 | 450 | 700 | 1.6 | No |
| Example 5 | 8.6 | 3,870 | 450 | 750 | 1.4 | No |
| Example 6 | 9.2 | 4,600 | 500 | 800 | 1.2 | No |
| Example 7 | 10 | 4,500 | 450 | 850 | 1.3 | No |
| Comparative Example 1 | 1.2 | 1,440 | 1,200 | 850 | 5.2 | Yes |

L1: long side of primary particle
L2: short side of primary particle

Average particle size of the secondary particle in Comparative Example 1 was 23 μm.

In the case of LiNi$_{0.82}$Co$_{0.15}$Al$_{0.03}$O$_2$, no sample of L1/L2>10 could be synthesized, although synthesis conditions such as calcination temperature were varied.

TABLE 2

As to LiNi$_{0.34}$Co$_{0.33}$Mn$_{0.33}$O$_2$

| | L1/L2 | L1 (nm) | L2 (nm) | Calcination temperature (° C.) | Increasing rate of internal resistance | Cracking of secondary particle |
|---|---|---|---|---|---|---|
| Example 8 | 1.6 | 640 | 400 | 500 | 1.9 | No |
| Example 9 | 1.8 | 810 | 450 | 600 | 1.8 | No |
| Example 10 | 2.5 | 875 | 350 | 650 | 1.8 | No |
| Example 11 | 4.2 | 2,100 | 500 | 700 | 1.6 | No |
| Example 12 | 7.6 | 4,180 | 550 | 750 | 1.5 | No |
| Example 13 | 9.3 | 4,185 | 450 | 800 | 1.4 | No |
| Example 14 | 9.8 | 3,920 | 400 | 850 | 1.6 | No |
| Comparative Example 2 | 1.1 | 1,650 | 1,500 | 850 | 7.2 | Yes |

Average particle size of the secondary particle in Comparative Example 2 was 22 μm.

In the case of LiNi$_{0.34}$Co$_{0.33}$Mn$_{0.33}$O$_2$, no sample of L1/L2>9.8 could be synthesized, although synthesis conditions such as calcination temperature were varied.

TABLE 3

As to LiNi$_{0.5}$Mn$_{0.5}$O$_2$

| | L1/L2 | L1 (nm) | L2 (nm) | Calcination temperature (° C.) | Increasing rate of internal resistance | Cracking of secondary particle |
|---|---|---|---|---|---|---|
| Example 15 | 1.5 | 600 | 400 | 500 | 1.5 | No |
| Example 16 | 2.3 | 1,150 | 500 | 600 | 1.8 | No |
| Example 17 | 3.2 | 1,760 | 550 | 650 | 1.7 | No |
| Example 18 | 5.2 | 3,120 | 600 | 700 | 1.4 | No |
| Example 19 | 6.2 | 3,410 | 550 | 750 | 1.3 | No |
| Example 20 | 8.6 | 3,870 | 450 | 800 | 1.5 | No |

TABLE 3-continued

As to $LiNi_{0.5}Mn_{0.5}O_2$

| | L1/L2 | L1 (nm) | L2 (nm) | Calcination temperature (° C.) | Increasing rate of internal resistance | Cracking of secondary particle |
|---|---|---|---|---|---|---|
| Example 21 | 9.9 | 3,960 | 400 | 850 | 1.6 | No |
| Comparative Example 3 | 1.3 | 2,080 | 1,600 | 850 | 5.3 | Yes |

Average particle size of the secondary particle in Comparative Example 3 was 20 μm.

In the case of $LiNi_{0.5}Co_{0.33}Mn_{0.5}O_2$, no sample of L1/L2>9.9 could be synthesized, although synthesis conditions such as calcination temperature were varied.

L1 and L2 in the above Tables 1 to 3 (further, similar in other Examples and Comparative Examples) were evaluated by SEM observation of a cross-section of each sample.

In addition, in the above Tables 1 to 3 (further, similar in other Examples and Comparative Examples); average values of L1/L2 are shown. Specifically, the average value was obtained by sampling 10 particles randomly from primary particles in a secondary particle.

Increasing rate of internal resistance in the above Tables 1 to 3 (further, similar in other Examples and Comparative Examples) was a value calculated as (internal resistance after 500 cycles)/(initial internal resistance).

Cracking of secondary particle in the above Tables 1 to 3 (further, similar in other Examples and Comparative Examples) was measured by sampling 10 particles randomly from secondary particles in the positive electrode material. When cracking of secondary particle was found at least in one particle, the sample was rated as "Yes", and when no cracking was found in all particles, the sample was rated as "No".

(Discussion on L1/L2)

When lithium nickel composite oxide is used as a positive electrode active material, its volume expands/contracts by charge and discharge. This gives a stress in the secondary particle resulting in an occurrence of cracking among primary particles. Due to occurrence of the cracking, electron conductivity among primary particles decreases, and internal resistance increases. As shown in the above Tables 1 to 3, it was confirmed that by using a primary particle having different aspect ratios, that is, a ratio of L1/L2≥1.5, as in the rectangular, oval-sphere, needle-like, plate-like, horn and columnar shapes (further more desirably, by orienting the primary particle toward the center of secondary particle), direction of the expansion/contraction by charge and discharge was determined, the stress due to the expansion/contraction among primary particles became less, and occurrence of cracking among primary particles by charge and discharge at a high temperature was prevented. It was also found that these particle designs could be controlled by using a nickel hydroxide as a raw material and selecting the thermal decomposition temperature and the calcination temperature, as shown in Tables 1 to 3.

TABLE 4

As to $LiNi_{0.82}Co_{0.15}Al_{0.03}O_2$

| | Probability | Thermal decomposition temperature (° C.) | Calcination temperature (° C.) | Increasing rate of internal resistance | Cracking of secondary particle |
|---|---|---|---|---|---|
| Example 22 | 50 | 300 | 600 | 2.3 | No |
| Example 23 | 60 | 350 | 650 | 2.2 | No |
| Example 24 | 70 | 350 | 700 | 2.2 | No |
| Example 25 | 80 | 400 | 750 | 1.6 | No |
| Example 26 | 90 | 400 | 800 | 1.4 | No |
| Example 27 | 100 | 500 | 850 | 1.5 | No |
| Reference Example 4 | 20 | 400 | 450 | 7.2 | Yes |
| Reference Example 5 | 40 | 400 | 475 | 6.3 | Yes |

In each Example and Reference Example in the above Table 4, primary particles having L1/L2 of 2.5 to 10 were used. These L1/L2 ratios were measured and confirmed by the similar method to that described in the above Tables 1 to 3.

TABLE 5

As to $LiNi_{0.34}Co_{0.33}Mn_{0.33}O_2$

| | Probability | Thermal decomposition temperature (° C.) | Calcination temperature (° C.) | Increasing rate of internal resistance | Cracking of secondary particle |
|---|---|---|---|---|---|
| Example 28 | 50 | 300 | 600 | 2.4 | No |
| Example 29 | 60 | 350 | 650 | 2.2 | No |

TABLE 5-continued

As to $LiNi_{0.34}Co_{0.33}Mn_{0.33}O_2$

| | Probability | Thermal decomposition temperature (° C.) | Calcination temperature (° C.) | Increasing rate of internal resistance | Cracking of secondary particle |
|---|---|---|---|---|---|
| Example 30 | 70 | 350 | 700 | 1.9 | No |
| Example 31 | 80 | 400 | 750 | 1.8 | No |
| Example 32 | 90 | 400 | 800 | 1.7 | No |
| Example 33 | 100 | 500 | 850 | 1.3 | No |
| Reference Example 6 | 20 | 400 | 450 | 6.2 | Yes |
| Reference Example 7 | 40 | 400 | 475 | 5.3 | Yes |

In each Example and Reference Example in the above Table 5, primary particles having L1/L2 of 1.8 to 9.8 were used. These L1/L2 ratios were measured and confirmed by the similar method to that described in the above Tables 1 to 3.

TABLE 6

As to $LiNi_{0.5}Mn_{0.5}O_2$

| | Probability | Thermal decomposition temperature (° C.) | Calcination temperature (° C.) | Increasing rate of internal resistance | Cracking of secondary particle |
|---|---|---|---|---|---|
| Example 34 | 50 | 300 | 600 | 2.4 | No |
| Example 35 | 60 | 350 | 650 | 2.2 | No |
| Example 36 | 70 | 350 | 700 | 2.1 | No |
| Example 37 | 80 | 400 | 750 | 1.5 | No |
| Example 38 | 90 | 400 | 800 | 1.7 | No |
| Example 39 | 100 | 500 | 850 | 1.6 | No |
| Reference Example 8 | 20 | 400 | 450 | 6.2 | Yes |
| Reference Example 9 | 40 | 400 | 475 | 5.3 | Yes |

In each Example and Reference Example in the above Table 6, primary particles having L1/L2 of 2.3 to 9.9 were used. These L1/L2 ratios were measured and confirmed by the similar method to that described in the above Tables 1 to 3.

In the above Tables 4 to 6 (and further, similar to other Examples and Comparative Examples), "probability" means a probability of primary particle having different aspect ratios, in which the longitudinal direction (the long side direction) thereof is oriented toward the center of secondary particle, among the primary particles having different aspect ratios (that is, L1/L2≥1.5) composing the secondary particle. These data were obtained by observing cross-sections of samples (number of samples of the secondary particle=10) using a SEM.

(Discussion on the probability of primary particle having different aspect ratios, in which the longitudinal direction (the long side direction) thereof is oriented toward the center of secondary particle, among the primary particles having different aspect ratios (that is, L1/L2≥1.5) composing the secondary particle)

When lithium nickel composite oxide is used as a positive electrode active material, its volume expands/contracts by charge and discharge. This gives a stress in the secondary particle resulting in an occurrence of cracking among primary particles. Due to occurrence of the cracking, electron conductivity among primary particles decreases, and internal resistance increases. As shown in the above Tables 4 to 6, it was confirmed that by using secondary particle comprising primary particles having different aspect ratios, as in the rectangular, oval-sphere, needle-like, plate-like, horn and columnar shapes, and further, by arranging at least a part of, in particular, over 40% of, and preferably 50% or more of the primary particles in such way that the longitudinal direction (the long side direction) thereof were oriented toward the center of secondary particle, direction of the expansion/contraction by charge and discharge was determined, the stress due to the expansion/contraction among primary particles became less, and occurrence of cracking among primary particles by charge and discharge at a high temperature was prevented. It was also found that these particle designs could be controlled by using a nickel hydroxide as a raw material and selecting the thermal decomposition temperature and the calcination temperature, as shown in Tables 4 to 6.

TABLE 7

As to $LiNi_{0.82}Co_{0.15}Al_{0.03}O_2$

| | Porosity (%) | Thermal decomposition temperature (° C.) | Calcination temperature (° C.) | Increasing rate of internal resistance | Cracking of secondary particle |
|---|---|---|---|---|---|
| Example 40 | 0.2 | 300 | 850 | 2.1 | No |
| Example 41 | 0.5 | 350 | 825 | 1.8 | No |
| Example 42 | 1.6 | 400 | 800 | 1.6 | No |
| Example 43 | 2.3 | 400 | 775 | 1.7 | No |
| Example 44 | 3.6 | 450 | 750 | 1.5 | No |
| Example 45 | 4.2 | 450 | 725 | 1.3 | No |
| Example 46 | 5 | 500 | 700 | 1.3 | No |
| Comparative Example 10 | 0 | 400 | 850 | 6.2 | Yes |

L1/L2 = 5.6 to 6.4

In the case of $LiNi_{0.82}Co_{0.15}Al_{0.03}O_2$, no sample having a porosity of 5% or more could be synthesized, although synthesis conditions such as calcination temperature were varied.

TABLE 8

As to $LiNi_{0.34}Co_{0.33}Mn_{0.33}O_2$

| | Porosity (%) | Thermal decomposition temperature (° C.) | Calcination temperature (° C.) | Increasing rate of internal resistance | Cracking of secondary particle |
|---|---|---|---|---|---|
| Example 47 | 0.3 | 300 | 850 | 2.2 | No |
| Example 48 | 0.5 | 350 | 825 | 1.9 | No |
| Example 49 | 1.5 | 400 | 800 | 1.8 | No |
| Example 50 | 2.4 | 400 | 775 | 1.7 | No |
| Example 51 | 3.9 | 450 | 750 | 1.8 | No |
| Example 52 | 4.3 | 450 | 725 | 1.6 | No |
| Example 53 | 4.8 | 500 | 700 | 1.5 | No |
| Comparative Example 11 | 0 | 400 | 850 | 8 | Yes |

L1/L2 = 5.2 to 6.8

In the case of $LiNi_{0.34}Co_{0.33}Mn_{0.33}O_2$, no sample having a porosity of 4.8% or more could be synthesized, although synthesis conditions such as calcination temperature were varied.

TABLE 9

As to $LiNi_{0.5}Mn_{0.5}O_2$

| | Porosity (%) | Thermal decomposition temperature (° C.) | Calcination temperature (° C.) | Increasing rate of internal resistance | Cracking of secondary particle |
|---|---|---|---|---|---|
| Example 54 | 0.2 | 300 | 850 | 2.3 | No |
| Example 55 | 0.9 | 350 | 825 | 2.2 | No |
| Example 56 | 1.3 | 400 | 800 | 2 | No |
| Example 57 | 1.9 | 400 | 775 | 1.8 | No |
| Example 58 | 3.1 | 450 | 750 | 1.7 | No |
| Example 59 | 4.6 | 450 | 725 | 1.8 | No |
| Example 60 | 5 | 500 | 700 | 1.4 | No |
| Comparative Example 12 | 0 | 400 | 850 | 7.3 | Yes |

L1/L2 = 5.6 to 7.2

In the case of LiNi$_{0.5}$Co$_{0.33}$Mn$_{0.5}$O$_2$, no sample having a porosity of 5% or more could be synthesized, although synthesis conditions such as calcination temperature were varied.

"Porosity (%)" in the above Tables 7 to 9 means porosity of secondary particle. These data were obtained by cutting out a cross-section of secondary particle of the positive electrode active material as a sample (number of samples of the secondary particles: 10) by means of FIB processing, obtaining image data of the cross-section by SEM, loading the image data obtained into a computer, and dividing the cross-section into a vacancy part and a material part by image processing.

(Discussion on the Porosity of Secondary Particle)

When lithium nickel composite oxide is used as a positive electrode active material, its volume expands/contracts by charge and discharge. This gives a stress in the secondary particle resulting in an occurrence of cracking among primary particles. Due to occurrence of the cracking, electron conductivity among primary particles decreases, and internal resistance increases. As shown in the above Tables 7 to 9, it was confirmed that by using primary particles having different aspect ratios, as in the rectangular, oval-sphere, needle-like, plate-like, horn and columnar shape, and further, by controlling the porosity of secondary particle within a range from 0.2 to 5%, a space for the expansion/contraction among primary particles when volume was expanded/contracted by charge and discharge could be secured, the stress due to the expansion/contraction among primary particles became less, and occurrence of cracking among primary particles by charge and discharge at a high temperature was prevented. It was also found that these particle designs could be controlled by using a nickel hydroxide as a raw material and selecting the thermal decomposition temperature and the calcination temperature, as shown in Tables 7 to 9.

TABLE 10

As to LiNi$_{0.82}$Co$_{0.15}$Al$_{0.03}$O$_2$

|  | Probability 2 (%) | Thermal decomposition temperature (° C.) | Calcination temperature (° C.) | Increasing rate of internal resistance | Cracking of secondary particle |
|---|---|---|---|---|---|
| Example 61 | 95 | 300 | 850 | 1.2 | No |
| Example 62 | 80 | 350 | 825 | 1.5 | No |
| Example 63 | 65 | 400 | 800 | 1.4 | No |
| Example 64 | 45 | 400 | 775 | 1.6 | No |
| Example 65 | 38 | 450 | 750 | 1.8 | No |
| Example 66 | 30 | 450 | 725 | 1.7 | No |
| Example 67 | 22 | 500 | 700 | 1.6 | No |
| Comparative Example 13 | 10 | 400 | 850 | 7.2 | Yes |

L1/L2 = 4.2 to 6.8

TABLE 11

As to LiNi$_{0.34}$Co$_{0.33}$Mn$_{0.33}$O$_2$

|  | Probability 2 (%) | Thermal decomposition temperature (° C.) | Calcination temperature (° C.) | Increasing rate of internal resistance | Cracking of secondary particle |
|---|---|---|---|---|---|
| Example 68 | 98 | 300 | 850 | 1.5 | No |
| Example 69 | 75 | 350 | 825 | 1.2 | No |
| Example 70 | 69 | 400 | 800 | 1.4 | No |
| Example 71 | 58 | 400 | 775 | 1.6 | No |
| Example 72 | 40 | 450 | 750 | 1.8 | No |
| Example 73 | 32 | 450 | 725 | 1.6 | No |
| Example 74 | 24 | 500 | 700 | 1.8 | No |
| Comparative Example 14 | 12 | 400 | 850 | 9.2 | Yes |

L1/L2 = 6.2 to 8.2

TABLE 12

As to LiNi$_{0.5}$Mn$_{0.5}$O$_2$

|  | Probability 2 (%) | Thermal decomposition temperature (° C.) | Calcination temperature (° C.) | Increasing rate of internal resistance | Cracking of secondary particle |
|---|---|---|---|---|---|
| Example 75 | 99 | 300 | 850 | 1.3 | No |
| Example 76 | 70 | 350 | 825 | 1.2 | No |
| Example 77 | 65 | 400 | 800 | 1.5 | No |
| Example 78 | 52 | 400 | 775 | 1.8 | No |
| Example 79 | 43 | 450 | 750 | 1.9 | No |
| Example 80 | 29 | 450 | 725 | 1.8 | No |
| Example 81 | 20 | 500 | 700 | 1.5 | No |

TABLE 12-continued

<table>
<tr><th colspan="6">As to LiNi$_{0.5}$Mn$_{0.5}$O$_2$</th></tr>
<tr><th></th><th>Probability 2 (%)</th><th>Thermal decomposition temperature (° C.)</th><th>Calcination temperature (° C.)</th><th>Increasing rate of internal resistance</th><th>Cracking of secondary particle</th></tr>
<tr><td>Comparative Example 15</td><td>13</td><td>400</td><td>850</td><td>8.2</td><td>Yes</td></tr>
</table>

L1/L2 = 5.2 to 8.2

"Probability 2(%)" in the above Tables 10 to 12 means a probability (%) of containing primary particle having different aspect ratios (that is, L1/L2=4.2 to 8.2≥1.5) in secondary particle. These data were obtained by SEM observation of cross-sections of samples.

(Discussion on the Probability of Containing Primary Particle Having Different Aspect Ratios in the Positive Electrode Active Material (Here, Synonymous with Secondary Particle))

When lithium nickel composite oxide is used as a positive electrode active material, its volume expands/contracts by charge and discharge. This gives a stress in the secondary particle resulting in an occurrence of cracking among primary particles. Due to occurrence of the cracking, electron conductivity among primary particles decreases, and internal resistance increases. As shown in the above Tables 10 to 12, it was confirmed that by using primary particles having different aspect ratios, as in the rectangular, oval-sphere, needle-like, plate-like, horn and columnar shape, and further, by controlling probability of containing primary particle having different aspect ratios to be 20% or more, direction of the expansion/contraction in volume by charge and discharge became easy to be determined, the stress due to the expansion/contraction among primary particles became less, and occurrence of cracking among primary particles by charge and discharge at a high temperature was prevented. It was also found that these particle designs could be controlled by using nickel hydroxide as a raw material and selecting the thermal decomposition temperature and the calcination temperature, as shown in Tables 10 to 12.

Further, the present application is based on JP Application No. 2005-133667, filed on 28 Apr. 2005, and its disclosure has been incorporated herein in its entirety by reference.

What is claimed is:

1. A positive electrode material for a non-aqueous electrolyte lithium-ion battery, the positive electrode material comprising:
a secondary particle comprising primary particles of lithium-nickel composite oxide having an aspect ratio greater than or equal to 1.5, as a positive electrode active material,
wherein at least 20% of said primary particles in said secondary particle have an aspect ratio greater than or equal to 1.5, and
wherein at least about 50% of the primary particles having an aspect ratio greater than or equal to 1.5 are arranged so as to make a longitudinal direction (a long side direction) thereof oriented toward a center of the secondary particle.

2. The positive electrode material according to claim 1, wherein said primary particles having an aspect ratio greater than or equal to 1.5 are in a rectangular, oval-spherical, needle, plate, horn, or columnar shape.

3. The positive electrode material according to claim 1, wherein said at least 20% of said primary particles have an aspect ratio between 1.5 and 10.

4. The positive electrode material according to claim 1, wherein a porosity of the secondary particle is 0.2 to 5%.

5. A non-aqueous electrolyte lithium-ion battery comprising the positive electrode material set forth in claim 1.

6. A battery assembly comprising more than one non-aqueous electrolyte lithium-ion battery as set forth in claim 5 that are connected in parallel-series, series-parallel, series or parallel.

7. A composite battery assembly comprising battery assemblies connected in series or parallel, wherein at last one of the assemblies is the battery assembly set forth in claim 6.

8. The composite battery assembly according to claim 7, wherein each of the battery assemblies is connected in a detachable manner.

9. A vehicle comprising the battery assembly set forth in claim 6.

10. A vehicle comprising the composite battery assembly set forth in claim 7.

11. A vehicle comprising the composite battery assembly set forth in claim 8.

12. The positive electrode material according to claim 1, wherein at least about 80% of the primary particles having an aspect ratio eater than or equal to 1.5 are arranged so as to make the longitudinal direction (the long side direction) thereof oriented toward a center of the secondary particle.

13. The positive electrode material according to claim 1, wherein about 100% of the primary particles having an aspect ratio eater than or equal to 1.5 are arranged so as to make the longitudinal direction (the long side direction) thereof oriented toward a center of the secondary particle.

14. A positive electrode material for a non-aqueous electrolyte lithium-ion battery, the positive electrode material comprising:
a secondary particle comprising primary particles of lithium-nickel composite oxide having an aspect ratio greater than or equal to 1.5, as the positive electrode active material,
wherein at least 20% of said primary particles in said secondary particle have an aspect ratio greater than or equal to 1.5,
wherein at least 50% of the primary particles having an aspect ratio greater than or equal to 1.5 are arranged so as to make a longitudinal direction (a long side direction) thereof oriented toward a center of the secondary particle, and
wherein a primary metal in said lithium-nickel composite oxide is nickel.

15. A positive electrode material for a non-aqueous electrolyte lithium-ion battery, the positive electrode material comprising:

a secondary particle comprising primary particles of lithium-nickel composite oxide having an aspect ratio greater than or equal to 1.5, as the positive electrode active material, wherein at least 20% of said primary particles in said secondary particle have an aspect ratio greater than or equal to 1.5, wherein at least 50% of the primary particles having an aspect ratio greater than or equal to 1.5 are arranged so as to make a longitudinal direction (a long side direction) thereof oriented toward a center of the secondary particle, and wherein said lithium-nickel composite oxide includes cobalt, an amount of nickel in said lithium-nickel composite oxide is greater than an amount of cobalt is said lithium-nickel composite oxide.

16. A positive electrode material for a non-aqueous electrolyte lithium-ion battery, the positive electrode material comprising:

a secondary particle comprising primary particles of lithium-nickel composite oxide having an aspect ratio greater than or equal to 1.5, as the positive electrode active material, wherein at least 20% of said primary particles in said secondary particle have an aspect ratio greater than or equal to 1.5, wherein at least 50% of the primary particles having an aspect ratio greater than or equal to 1.5 are arranged so as to make a longitudinal direction (a long side direction) thereof oriented toward a center of the secondary particle, and wherein said lithium-nickel composite oxide includes more nickel than any other metal.

17. A positive electrode material for a non-aqueous electrolyte lithium-ion battery, the positive electrode material comprising:

a secondary particle comprising primary particles of lithium-nickel composite oxide having an aspect ratio greater than or equal to 1.5, as the positive electrode active material, wherein at least 20% of said primary particles in said secondary particle have an aspect ratio greater than or equal to 1.5, wherein at least 50% of the primary particles having an aspect ratio greater than or equal to 1.5 are arranged so as to make a longitudinal direction (a long side direction) thereof oriented toward a center of the secondary particle, and wherein said lithium-nickel composite oxide includes cobalt, an amount of cobalt relative to a total amount of metals in said lithium-nickel composite oxide is less than 60%.

* * * * *